United States Patent
Brinkman et al.

(10) Patent No.: US 8,735,495 B2
(45) Date of Patent: May 27, 2014

(54) LOW-VISCOSITY URETHANE SYSTEM

(75) Inventors: Larry F. Brinkman, Woodstock, IL (US); David E. Vietti, Cary, IL (US); Joseph James Zupancic, Glen Ellyn, IL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/547,168

(22) Filed: Jul. 12, 2012

(65) Prior Publication Data

US 2013/0018146 A1    Jan. 17, 2013

Related U.S. Application Data

(60) Provisional application No. 61/508,092, filed on Jul. 15, 2011.

(51) Int. Cl.
| | | |
|---|---|---|
| *C08G 18/42* | (2006.01) | |
| *C08G 18/10* | (2006.01) | |
| *C08G 18/12* | (2006.01) | |
| *C08G 18/76* | (2006.01) | |
| *C09J 175/06* | (2006.01) | |

(52) U.S. Cl.
USPC .......................................... 525/127; 525/131

(58) Field of Classification Search
CPC ........... C08G 18/4211; C08G 18/4216; C08G 18/10; C08G 18/12; C08G 18/7671; C09J 175/06
USPC ................................................ 525/127, 131
See application file for complete search history.

(56) References Cited

U.S. PATENT DOCUMENTS

| | | | |
|---|---|---|---|
| 3,028,367 A | | 4/1962 | O'Brien |
| 3,644,457 A | * | 2/1972 | König et al. ................. 560/351 |
| 3,763,079 A | | 10/1973 | Fryd |
| 4,206,299 A | * | 6/1980 | Yamazaki et al. ............ 528/288 |
| 4,419,476 A | | 12/1983 | Coughlin et al. |
| 5,096,980 A | | 3/1992 | Yamazaki et al. |
| 5,527,616 A | | 6/1996 | Hatano et al. |
| 5,763,527 A | * | 6/1998 | Chen et al. .................... 524/590 |
| 6,353,078 B1 | * | 3/2002 | Murata et al. ................... 528/83 |
| 6,579,406 B2 | * | 6/2003 | Brinkman .................. 156/331.4 |
| 6,730,738 B2 | * | 5/2004 | Brinkman ..................... 525/131 |
| 7,060,759 B2 | * | 6/2006 | Brinkman ..................... 525/454 |
| 7,220,338 B2 | * | 5/2007 | Chen et al. ................. 156/331.4 |
| 2003/0232956 A1 | * | 12/2003 | Brinkman ....................... 528/59 |
| 2006/0205909 A1 | * | 9/2006 | O'Brien .......................... 528/44 |
| 2008/0132714 A1 | | 6/2008 | Hillshafer |
| 2010/0119821 A1 | | 5/2010 | Uemura et al. |
| 2010/0203344 A1 | | 8/2010 | Simons |

FOREIGN PATENT DOCUMENTS

| | | |
|---|---|---|
| EP | 0470461 A2 | 2/1992 |
| WO | 9730100 | 8/1997 |

* cited by examiner

*Primary Examiner* — Mike M Dollinger
(74) *Attorney, Agent, or Firm* — Kenneth Crimaldi

(57) ABSTRACT

A two-component urethane system. The first component is a hydroxy-terminated polyester polyol containing polymerized residues of phthalic acid and an aliphatic diol having $M_n$ from 60 to 150, and having no more than 15 wt % polymerized residues of aliphatic acids. The second component is an isocyanate-terminated prepolymer containing polymerized residues of diphenyl methane diisocyanate and/or toluene diisocyanate and a glycol or polyol having $M_n$ from 90 to 1000.

9 Claims, No Drawings

LOW-VISCOSITY URETHANE SYSTEM

BACKGROUND

This invention relates generally to a low-viscosity two-component urethane system which can be coated onto a substrate at a high solids content.

Two-component urethane systems based on phthalic anhydrides or acids are well known. For example, U.S. Pat. No. 3,763,079 to Fryd discloses a two-component urethane system in which the polyol component is based on isophthalic acids or phthalic acids and aliphatic diacids, and the isocyanate component is based on toluene diisocyanate. However, there is a need for alternative systems based on other materials which can be coated at high solids levels.

STATEMENT OF INVENTION

The present invention is directed to a two-component urethane system comprising: (a) a hydroxy-terminated polyester polyol comprising polymerized residues of: (i) 40 to 75 wt % of phthalic acid, and (ii) 25 to 60 wt % of an aliphatic diol having $M_n$ from 60 to 150; wherein the hydroxy-terminated polyester polyol has a hydroxyl number from 15 to 60 mg KOH/g and has no more than 15 wt % polymerized residues of aliphatic acids; and (b) an isocyanate-terminated prepolymer comprising polymerized residues of: (i) at least one of diphenyl methane diisocyanate (MDI) and toluene diisocyanate (TDI); and (ii) a glycol or polyol having $M_n$ from 90 to 1000.

DETAILED DESCRIPTION

All percentages are weight percentages, and all temperatures are in ° C., unless otherwise indicated. Percentages of monomer residues are on a solids basis, i.e., excluding solvents. "Phthalic acid" refers to benzene-1,2-dicarboxylic acid. Polymerized residues of phthalic acid may be the result of using either phthalic acid or phthalic anhydride as a starting material in preparation of the hydroxy-terminated polyester polyol. "Aliphatic acids" are dicarboxylic acids having no aromatic rings, e.g., adipic acid, azelaic acid, glutaric acid and succinic acid. Preferably, the hydroxy-terminated polyester polyol has no more than 10 wt % polymerized residues of aliphatic acids, preferably no more than 5 wt %, preferably no more than 3 wt %. "Toluene diisocyanate" refers to the commercial product sold under this name, which is predominantly the 2,4-isomer, with small amounts of the 2,6-isomer, and possibly other isomers.

The hydroxy-terminated polyester polyol of this invention contains polymerized and esterified residues of phthalic acid and an aliphatic diol; it may also contain other di-acids and diols. The aliphatic diol may be an α,ω-dihydroxy alkane or an ethylene or propylene glycol oligomer. Preferred aliphatic diols include ethylene glycol, propylene glycol, 1,4-butanediol, 1,6-hexanediol, diethylene glycol, dipropylene glycol and triethylene glycol. Especially preferred aliphatic diols include diethylene glycol and 1,6-hexanediol. Preferably, the aliphatic diol has $M_n$ from 90 to 150, preferably from 90 to 130, preferably from 100 to 125. The hydroxy-terminated polyester polyol is a hydroxy-terminated polyester, preferably with a hydroxyl number from 15 to 55 mg KOH/g, preferably from 20 to 50, preferably from 22 to 35. Preferably, the hydroxy-terminated polyester polyol contains from 40% to 75% polymerized residues of phthalic acid; preferably at least 45%, preferably at least 48%, preferably at least 50%, preferably at least 52%; preferably no more than 70%, preferably no more than 65%, preferably no more than 63%, preferably no more than 61%, preferably no more than 59%. Other isomers of phthalic acid (e.g., isophthalic acid or terephtahalic acid) may also be used to make the hydroxy-terminated polyester polyol, but preferably these other isomers are no more than 20 wt % of the total weight of di-acids, preferably no more than 15 wt %, preferably no more than 10 wt %, preferably no more than 7 wt %, preferably no more than 5 wt %. Preferably, the hydroxy-terminated polyester polyol contains from 25% to 60% polymerized residues of an aliphatic diol having $M_n$ from 60 to 150; preferably at least 30%, preferably at least 35%, preferably at least 37%, preferably at least 39%; preferably no more than 55%, preferably no more than 52%, preferably no more than 50%, preferably no more than 48%. Small amounts of residues of compounds with more than three hydroxy groups may be present to increase branching, e.g., pentaerythritol. Preferably, the amount of residues of compounds with more than three hydroxy groups is no more than 5% of the total amount of diol(s), preferably no more than 2%, preferably no more than 1%, preferably no more than 0.5%, preferably no more than 0.2%, preferably no more than 0.1%. Suitable triols include, e.g., glycerol, trimethylol ethane, trimethylol propane and castor oil. The amount of diols, triols, and tetra-ols added is sufficient to react with all of the carboxyl functionalities and to result in a polyol with a hydroxyl number from 15 to 60 mg KOH/g. This amount can be calculated easily from the amounts of other ingredients.

Preferably, the hydroxy-terminated polyester polyol is produced by the steps allowing phthalic anhydride (or phthalic acid) to react with the aliphatic diol at a temperature from 150° C. to 260° C. Preferably, the reaction temperature is from 150° C. to 240° C., preferably from 170° C. to 235° C., preferably from 180° C. to 230° C. Preferably, the reaction pressure is about atmospheric pressure (about 100 kPa), although reduced pressure may be used to assist in removing water formed in the esterification reaction. Preferably, the reaction mixture is heated first to about 100-130° C., followed by heating to the indicated reaction temperature to remove water. Reaction times of course will vary with the other conditions, and can be determined easily by one skilled in the art, but typically are in the range from 5 hours to 30 hours, preferably from 12 to 25 hours. Preferably, an esterification/transesterification catalyst is present in an amount no more than 0.2 wt %, preferably no more than 0.05 wt %. These catalysts are well known in the art and include tin, titanium, bismuth and zirconium catalysts. Tin catalysts are preferred, especially alkyltin tris-alkanoates and hydroxybutyl tin oxide, but titanates, e.g., tetra-alkoxy titanates or bismuth alkanoates or mixtures thereof may also be used.

Preferably, the glycol or polyol having $M_n$ from 90 to 1000 which is incorporated into the isocyanate terminated prepolymer has two to three hydroxyl groups per molecule. Preferably, the glycol or polyol has $M_n$ from 150 to 800, preferably at least 250, preferably at least 300; preferably no more than 700, preferably no more than 600. Preferably, the polyol is a polyether or polyester polyol, preferably a polyether polyol. Preferably, the isocyanate-terminated prepolymer comprises polymerized residues of: (i) 50 to 85 wt % of at least one of MDI and TDI; and (ii) 15 to 50 wt % of a glycol or polyol having $M_n$ from 90 to 1000; preferably at least 55 wt % MDI/TDI and no more than 45 wt % glycol or polyol, preferably at least 60 wt % MDI/TDI and no more than 40 wt % glycol or polyol, preferably at least 65 wt % MDI/TDI and no more than 35 wt % glycol or polyol, preferably no more than 80 wt % MDI/TDI and at least 20 wt % glycol or polyol.

The isocyanate-terminated prepolymer has polymerized residues of MDI and/or TDI. Other difunctional isocyanates may be present, e.g., an aliphatic diisocyanate, e.g., hexamethylene diisocyanate. MDI may be a mixture of 4,4' and 2,4' isomers. Preferably, at least 80 wt % of the polymerized residues of isocyanates in the isocyanate-terminated prepolymer are from MDI and TDI, preferably at least 85 wt %, preferably at least 90 wt %, preferably at least 95 wt %. Preferably, at least 50 wt % of the MDI residues are from the 4,4' isomer, preferably at least 70 wt %, preferably at least 80 wt %, preferably at least 90 wt %, preferably at least 95 wt %. The difunctional aromatic isocyanate is mixed with a polyol to form the isocyanate-terminated prepolymer. In some embodiments of the invention, the polyol mixed into the isocyanate component is at least one difunctional or trifunctional polymer of ethylene oxide, propylene oxide or a combination thereof. Preferably, the isocyanate-terminated prepolymer has an isocyanate content from 7% to 21%, more preferably from 11% to 15%.

In the two-component system of this invention, the relative proportions of isocyanate groups to isocyanate-reactive groups may vary as desired, preferably within a molar ratio of NCO/OH groups of 0.9:1 to 2:1. In some embodiments of the invention, the NCO/OH group molar ratio is from 1:1 to 1.8:1, alternatively from 1.1:1 to 1.6:1, alternatively from 1.2:1 to 1.4:1.

The components of the present system are diluted with solvent prior to coating onto a substrate. As the term is used herein, a solvent is a substance which is liquid at 25° C. and has a boiling point at atmospheric pressure of no more than 100° C. Preferably, the combined components of the system as applied to the substrate contain from 45-60 wt % solids, preferably from 46-57 wt %, preferably from 47-55 wt %, preferably from 48-53 wt %. Suitable solvents include ethyl acetate, methyl acetate and methyl ethyl ketone. Ethyl acetate is especially preferred.

The system of the present invention contemplates the employment of two components, which preferably are mixed using a suitable mixer (e.g., an electrically, pneumatically, or an otherwise powered mechanical mixer, or a static mixer) prior to or during application to a substrate to form the bonding agent. Thus, the isocyanate component typically will be packaged separately from the polyol component. Mixing may take place at any suitable time prior to the laminating process. All of the present steps may be carried out under ambient room temperature or supra-ambient conditions. For example, the two components may be heated just prior to mixing and applied at elevated temperature during the coating and lamination process. Preferably, the temperature does not exceed 65° C. As desired, heating or cooling may be applied to the resulting laminate. Preferably, a gravure cylinder is used to transfer the mixed adhesive composition to a film, which is then laminated to a second film.

Preferably, a hydroxy-functional acrylic polymer is added to the composition as a flow aid to produce a uniform coating of adhesive on the film. Preferably, the hydroxy-functional acrylic polymer has $M_n$ from 5,000 to 70,000; preferably $M_n$ is at least 6,000, preferably at least 7,000, preferably at least 8,000; preferably $M_n$ is no greater than 60,000, preferably no greater than 50,000, preferably no greater than 40,000, preferably no greater than 30,000, preferably no greater than 20,000, preferably no greater than 15,000. Preferably, the hydroxyl-containing monomer is from 10 to 50 mole % of the acrylic polymer; preferably at least 12 mole %, preferably at least 15 mole %; preferably no greater than 30 mole %, preferably no greater than 25 mole %. Preferably, the amount of the hydroxy-functional acrylic polymer in the combined components of the composition is from 0.01 to 5 wt %; preferably at least 0.1 wt %, preferably at least 0.3 wt %, preferably at least 0.5 wt %; preferably no more than 3 wt %, preferably no more than 2 wt %, preferably no more than 1.5 wt %, preferably no more than 1 wt %. An acrylic polymer is a polymer having at least 50 wt % polymerized residues of acrylic monomers (e.g., acrylic acid, methacrylic acid, alkyl or hydroxyalkyl acrylates or methacrylates), preferably at least 70 wt %, preferably at least 80 wt %, preferably at least 90 wt %, preferably at least 95 wt %.

Preferably, phosphoric acid or a mixture of phosphoric acid and an epoxy resin is added to the composition to promote stability, improve adhesion and minimize viscosity build. Preferably the epoxy resin is a solid epoxy resin. Preferably, the phosphoric acid/epoxy resin mixture is added in an amount from 0.1 to 2 wt % of the combined components, preferably from 0.2 to 1.5 wt %, preferably from 0.3 to 1 wt %. Preferably, the phosphoric acid/epoxy mixture contains 5 to 40 wt % phosphoric acid, preferably 7 to 30 wt %, preferably 8 to 18 wt %. Preferably when phosphoric acid alone is added to promote stability, it is added in an amount from 0.01 to 2 wt % of the combined components, preferably from 0.03 to 1 wt %, preferably from 0.04 to 0.1 wt %. Preferably a solvent, e.g., ethyl acetate, is added to the mixture in an amount from 30-70 wt % of the total mixture including solvent.

The bonding agent of the present invention is useful for bonding two to five substrates together. The substrates may be similar material or dissimilar material. In a preferred embodiment, a layer of the bonding agent is applied to a first substrate layer, and the resulting bonding agent layer is covered with a second substrate layer to form a laminated article wherein the two substrates are bonded together by the dried layer of bonding agent. A third and fourth layer of film can be added to the laminate to form three- or four-layer laminates. In a preferred embodiment, the substrate layers are provided in the form of rolls of substrate material. The sheets may be on the order of 0.5 to 10 mil in thickness. Larger thicknesses are also possible, as are smaller thicknesses (e.g., on the order of 5 or more microns).

The compositions of the present invention can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations. The bonding agent is particularly attractive for packaging and sealing applications for laminating plastic films, metal films or metallized plastic films. Especially preferred films include low density polyethylene, high density polyethylene, polypropylene (cast, blown oriented, biaxially drawn), nylon, polystyrene, co-extruded films, polyester film, ceramic (SiOx, AlOx) coated film (polyester, nylon, etc.), polyacrylic acid-coated film (polyester, nylon, etc.), polyvinylidene chloride coated film, metallized film (polyester, polypropylene, etc.).

EXAMPLES

Solution viscosities were measured using a Brookfield viscometer operating at a temperature of approximately 25° C. and with fittings appropriate for the viscosity ranges measured. Resin viscosities were measured on an ICI cone and plate viscometer at the plate temperatures indicated. Resins were prepared as described in the following procedures.

Example 1

Preparation of Polyester Resin

| Item | Monomer/Intermediate | Charge (g) |
|---|---|---|
| 1 | Phthalic Anhydride | 1000.00 |
| 2 | Diethylene Glycol | 780.00 |
| 3 | FASCAT 9100 (Hydroxybutyltin oxide) | 2.00 |
| 4 | TYZOR TPT (Tetraisopropyl Titanate) | 0.40 |

1. Items 1-4 were charged to a 3 L flask equipped with a stirrer, thermocouple, nitrogen inlet, and a steam jacketed fractionating column and condenser for collecting water that distilled from the reactor. A very slow stream of nitrogen was passed through the head space of the reactor throughout the time of the reaction.
2. The heterogeneous mixture was heated to 100-130° C. and held at 120-130° C. for 0.25-0.50 Hrs.
3. The resin mixture was heated gradually to 225° C. At about 190° C., water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 450-500 torr. The vacuum was gradually decreased to about 100 torr. Pressure was held at about 100 torr and the temperature maintained at 225° C. until the acid number was less than 2.0 mg KOH/g sample
4. The resin solution was cooled to ca. 70-80° C. The reactor was disassembled and the warm resin poured into a container.

The final resin had the following properties: Acid Value (AV) 1.0; Hydroxyl Number (OHN) 35; Mn 2800, Mw 6200, and Viscosity 2025 mPas at 100° C. (cone & plate).

Example 2

Polyester Resin

STEPANPOL PD 56 diethylene glycol-phthalic anhydride polyester was tested. The polyester is a product of Stepan Company with the following properties reported in the product bulletin: Hydroxyl number: 51-61 mg KOH/g; Acid Value<1.5 mg KOH/g; Glass Transition Temperature −1° C.; Specific Gravity 1.27; Viscosity at 80° C. 6,000 mPas.

Example 3

Preparation of Polyester Resin

| Item | Monomer/Intermediate | Charge (g) |
|---|---|---|
| 1 | Phthalic Anhydride | 1000.00 |
| 2 | Diethylene Glycol | 765.00 |
| 3 | FASCAT 9100 (Hydroxybutyltin oxide) | 2.00 |
| 4 | TYZOR TPT (Tetraisopropyl Titanate) | 0.40 |

1. (As in Example 1)
2. (As in Example 1)
3. The resin mixture was heated gradually to 225° C. At about 190° C. water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 565 torr. The vacuum was gradually decreased to about 100 torr. Pressure was held at about 100 torr and the temperature maintained at 225° C. until the acid number was less than 2.0 mg KOH/g sample
4. The resin solution was cooled to ca. 70-80° C. The reactor was disassembled and the warm resin poured into a container.

The final resin had the following properties: Acid Value (AV) 1.3; Hydroxyl Number (OHN) 25; Mn 3000, Mw 7900, and Viscosity 4500 mPas at 100 C (cone & plate).

Example 4

Preparation of Polyester Resin

| Item | Monomer/Intermediate | Charge (g) |
|---|---|---|
| 1 | Phthalic Anhydride | 1000.00 |
| 2 | Diethylene Glycol | 780.00 |
| 3 | FASCAT 9100 (Hydroxybutyltin oxide) | 2.00 |
| 4 | TYZOR TPT (Tetraisopropyl Titanate) | 0.40 |

1. (As in Example 1)
2. (As in Example 1)
3. The resin mixture was heated gradually to 225° C. At about 190° C. water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 450 torr. The vacuum was gradually decreased to about 300 torr. Pressure was held at about 300 torr and the temperature maintained at 225° C. until the acid number was less than 2.0 mg KOH/g sample
4. The resin solution was cooled to ca. 70-80° C. The reactor was disassembled and the warm resin poured into a container.

The final resin had the following properties: Acid Value (AV) 1.7; Hydroxyl Number (OHN) 40; Viscosity 1975 mPas at 100° C. Added ethyl acetate to a portion of the product to obtain 77.9% solids, Hydroxyl Number (OHN) 31.1, Mn 1400, Mw 5400, and Viscosity at 25° C. of 2250 mPas.

Example 5

Preparation of Polyester Resin

| Item | Monomer/Intermediate | Charge (g) |
| --- | --- | --- |
| 1 | Phthalic Anhydride | 1000.00 |
| 2 | Diethylene Glycol | 780.00 |
| 3 | FASCAT 9100 (Hydroxybutyltin oxide) | 1.70 |

1. (As in Example 1) (items 1-3 charged initially)
2. (As in Example 1)
3. The resin mixture was heated gradually to 225° C. At about 190° C. water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 450 torr. The vacuum was gradually decreased to about 300 torr. Pressure was held at about 300 torr and the temperature maintained at 225° C. until the acid number was less than 2.0 mg KOH/g sample
4. The resin solution was cooled to ca. 70-80° C. The reactor was disassembled and the warm resin poured into a container.

The final resin had the following properties: Acid Value (AV) 1.7; Hydroxyl Number (OHN) 35.1; Viscosity 1275 mPas at 100 C (cone & plate). Added sufficient ethyl acetate and warmed to obtain a solution with the following properties: Solids 80.0%; Hydroxyl Number (OHN) 30.8; Mn 2450, Mw 5800, and Viscosity of 2725 mPas at 25° C.

Example 6

Preparation of Polyester Resin

| Item | Monomer/Intermediate | Charge (g) |
| --- | --- | --- |
| 1 | Phthalic Anhydride | 1000.00 |
| 2 | Diethylene Glycol | 780.00 |
| 3 | TYZOR TPT (Tetraisopropyl Titanate) | 0.90 |

1. (As in Example 1) (items 1-3 charged initially)
2. (As in Example 1)
3. The resin mixture was heated gradually to 225° C. At about 190° C. water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Pressure was held at about 550 torr and the temperature maintained at 225° C. until the acid number was 2.5 mg KOH/g sample
4. The resin solution was cooled to ca. 70-80° C. The reactor was disassembled and the warm resin poured into a container.

The final resin had the following properties: Acid Value 2.5 mg KOH/g; Hydroxyl Number (OHN) 37; Viscosity 1950 mPas at 100° C.; added sufficient ethyl acetate and warmed to obtain a solution with the following properties: solids 79.6%, Hydroxyl Number (OHN) 29.0, Mn 1700, Mw 4850, and Viscosity at 25° C. of 1430 mPas.

Example 7

Preparation of Polyester Resin

| Item | Monomer/Intermediate | Charge (g) |
| --- | --- | --- |
| 1 | Phthalic Anhydride | 1000.00 |
| 2 | Diethylene Glycol | 770.00 |
| 3 | Castor Oil | 28.00 |
| 4 | FASCAT 9100 (Hydroxybutyltin oxide) | 2.00 |
| 5 | Ethyl Acetate | 518.00 |

1. (As in Example 1)
2. (As in Example 1)
3. The resin mixture was heated gradually to 225° C. At about 190° C. water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 550 torr. The vacuum was gradually decreased to about 55 torr. Pressure was held at about 55 torr and the temperature maintained at 225° C. until the acid number was less than 2.5 mg KOH/g sample
4. The resin solution was cooled to ca. 70-80° C., then item 5 (ethyl acetate) was added. The mixture was stirred until the polyester resin was completely dissolved.
5. The solution was cooled to 50-60° C., then packaged.

The final resin had the following properties at 100% solids: Acid Value (AV) 2.2; viscosity, 2250 mPas at 100° C. (cone and plate). After dissolving in ethyl acetate: solids 75.0%, Acid Value (AV) 1.6; Hydroxyl Number (OHN) 19.0, Mn 1750, Mw 6300.

Example 8

Preparation of Polyester Resin

| Item | Monomer/Intermediate | Charge (g) |
| --- | --- | --- |
| 1 | Phthalic Anhydride | 1111.40 |
| 2 | Adipic Acid | 121.90 |
| 3 | Diethylene Glycol | 931.90 |
| 4 | FASCAT 9100 (Hydroxybutyltin oxide) | 2.00 |
| 5 | Ethyl Acetate | 500.00 |

1. (As in Example 1)
2. (As in Example 1)
3. The resin mixture was heated gradually to 225° C. At about 190° C. water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 600 torr. The vacuum was gradually decreased to about 445 torr. Pressure was held at about 445 torr and the temperature maintained at 225° C. until the acid number was 2.7 mg KOH/g sample 4. The resin solution was cooled to ca. 70-80° C., then item 5 (ethyl acetate) was added. The mixture was stirred until the polyester resin was completely dissolved.

5. The solution was cooled to 50-60° C., then packaged.

The final resin had the following properties: at 100% solids, Acid Value (AV) 2.4; Hydroxyl number (OHN) 20.0, Viscosity at 100° C., 3375 mPas; After adding ethyl acetate: solids 78.0%, Mn 3300, Mw 7300, and Viscosity at 25° C. of 1197 mPas at 75% solids.

Example 9

Preparation of Polyester Resin

| Item | Monomer/Intermediate | Charge (g) |
|---|---|---|
| 1 | Phthalic Anhydride | 914.00 |
| 2 | Diethylene Glycol | 700.00 |
| 3 | FASCAT 9100 (Hydroxybutyltin oxide) | 2.00 |
| 4 | TYZOR TPT (Tetraisopropyl Titanate) | 0.50 |

1. (As in Example 1)
2. (As in Example 1)
3. The resin mixture was heated gradually to 225° C. At about 190° C. water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 500 torr. The vacuum was gradually decreased to about 10 torr. Pressure was held at about 10 torr and the temperature maintained at 225° C. until the acid number was <2.0 mg KOH/g sample
4. The solution was cooled to 50-60° C., then packaged.

The final resin had the following properties: Acid Value (AV) 1.1; Hydroxyl Number (OHN) 23; Viscosity 4550 mPas at 100° C.; Mn 2,000, Mw 3,950.

Comparative Example 10

Preparation of Polyester Resin

| Item | Monomer/Intermediate | Charge (g) |
|---|---|---|
| 1 | Phthalic Anhydride | 435.30 |
| 2 | Adipic Acid | 184.10 |
| 3 | Diethylene Glycol | 477.70 |
| 4 | FASCAT 9100 (Hydroxybutyltin oxide) | 1.00 |
| 5 | Ethyl Acetate | 334.00 |

1. (As in Example 1)
2. (As in Example 1)
3. The resin mixture was heated gradually to 225° C. At about 190° C. water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 480 torr. The vacuum was gradually decreased to about 200 torr. Pressure was held at about 200 torr and the temperature maintained at 225° C. until the acid number was <2.0 mg KOH/g sample 4. The resin solution was cooled to ca. 70-80° C., then item 5 (ethyl acetate) was added. The mixture was stirred until the polyester resin was completely dissolved.

5. The solution was cooled to 50-60° C., then packaged.

The final resin had the following properties: At 100% solids, Acid Value (AV) 1.4, Viscosity at 100° C., 1310 mPas. After adding ethyl acetate: solids 75.2%, Mn 4400, Mw 8200.

Example 11

Preparation of Polyester Resin

STEPANPOL PH 56 was tested. This is a product of Stepan Company. The following properties were reported in the product bulletin: Hydroxyl number 53-59 mg KOH/g; Acid Value<1.0 mg KOH/g; Viscosity at 80° C. 4,400 mPas; Glass Transition, −15° C.

Example 12

Preparation of Coreactant

| Item | Monomer/Intermediate | Charge (g) |
|---|---|---|
| 1 | 4,4'-Diphenylmethane diisocyanate (ISONATE 125M) | 100.00 |
| 2 | Ethyl Acetate | 25.30 |
| 3 | Trimethylolpropane | 1.93 |
| 4 | Polypropylene glycol, Mw 430 (VORANOL 220-260) | 37.48 |
| 5 | Dipropylene glycol | 3.87 |
| 6 | Benzoyl chloride | 0.15 |

1. Item 1 was charged to a dry reactor at 50° C. The reaction mixture was stirred and kept under an atmosphere of dry nitrogen throughout the process.
2. Items 2 & 3 were charged to the reactor and the resin mixture was heated to 80° C.
3. Item 4 was added over 30 min while maintaining the reaction temperature at 80-85° C.
4. Item 5 was added.
5. The resin mixture was held at 80° C. for 2 hours.
6. The resin was tested and the % NCO was 13.9.
7. The resin was cooled to 50-60° C., item 6 added, stirring continued for a few minutes, then the solution was filtered and packaged.

The final resin had the following properties: 89.7% Solids, % NCO 13.9%.

Example 13

Preparation of Coreactant

| Item | Monomer/Intermediate | Charge (g) |
|---|---|---|
| 1 | 4,4'-Diphenylmethane diisocyanate (ISONATE 125M) | 100.00 |
| 2 | Trimethylolpropane | 6.68 |
| 3 | Ethyl Acetate | 25.30 |
| 4 | Polypropylene glycol, Mw 430 (VORANOL 220-260) | 30.80 |
| 5 | Benzoyl chloride | 0.15 |

1. (As in Example 12)
2. Items 2 & 3 were charged to the reactor and the resin mixture was heated to 80° C.
3. Item 4 was added over 30 min while maintaining the reaction temperature at 80-85° C.
4. The resin mixture was held at 80° C. for 2 hours.
5. The % NCO was monitored until it was 13.5±0.3%.
6. The resin was cooled to 50-60° C., item 5 added, stirring continued for a few minutes, then the solution was filtered and packaged.

The final resin had the following properties: 88.9% Solids, % NCO 13.3%.

Example 14

Preparation of Coreactant

| Item | Monomer/Intermediate | Charge (g) |
|---|---|---|
| 1 | 4,4'-Diphenylmethane diisocyanate (ISONATE 125M) | 200.00 |
| 2 | Trimethylolpropane | 2.38 |
| 3 | Ethyl Acetate | 52.7 |
| 4 | Polypropylene glycol, Mw 430 (VORANOL 220-260) | 96.11 |
| 5 | Benzoyl chloride | 0.1 |

1. (As in Example 12)
2. Items 2 & 3 were charged to the reactor and the resin mixture was heated to 80° C.
3. Item 4 was added over 30 min while maintaining the reaction temperature at 80-85° C.
4. The resin mixture was held at 80° C. for 2 hours.
5. The % NCO was monitored until it was 13.0±0.3%.
6. The resin was cooled to 50-60° C., item 5 added with stirring, then the solution was filtered and packaged The final resin had the following properties: 86.7% Solids, % NCO 13.1.

Example 15

Preparation of Coreactant

| Item | Monomer/Intermediate | Charge (g) |
|---|---|---|
| 1 | 4,4'-Diphenylmethane diisocyanate (ISONATE 125M) | 200.00 |
| 2 | Ethyl Acetate | 53.5 |
| 3 | Polypropylene glycol, Mw 430 (VORANOL 220-260) | 103.33 |
| 4 | Benzoyl chloride | 0.10 |

1. (As in Example 12)
2. Item 2 was charged to the reactor and the resin mixture was heated to 75° C.
3. Item 3 was added over 30 min while maintaining the reaction temperature at 70-80° C.
4. The resin mixture was held at 80° C. for 2 hours.
5. The % NCO was monitored until it was 13.5±0.3%.
6. The resin was cooled to 50-60° C., item 4 added; the solution was filtered and packaged The final resin had the following properties: 88.9% Solids, % NCO 13.3

Example 16

Preparation of Coreactant

| Item | Monomer/Intermediate | Charge (g) |
|---|---|---|
| 1 | 4,4'-Diphenylmethane diisocyanate (ISONATE 125M) | 200.00 |
| 2 | Propoxylated Glycerine, Mw 450 (VORANOL CP450) | 5.46 |
| 3 | Ethyl Acetate | 53.3 |
| 4 | Polypropylene glycol, Mw 430 (VORANOL 220-260) | 96.81 |
| 5 | Benzoyl chloride | 0.10 |

1. (As in Example 12)
2. Item 2 & 3 were charged to the reactor and the resin mixture was heated to 75° C.
3. Item 4 was added over 30 min while maintaining the reaction temperature at 70-80° C.
4. The resin mixture was held at 80° C. for 2 hours.
5. The % NCO was monitored until it was 13.7±0.3%.
6. The resin was cooled to 50-60° C., item 5 added with stirring, then the solution was filtered and packaged The final resin had the following properties: 91.0% Solids, % NCO 13.7%.

Example 17

Preparation of Coreactant

| Item | Monomer/Intermediate | Charge (g) |
|---|---|---|
| 1 | 4,4'-Diphenylmethane diisocyanate (ISONATE 125M) | 200.00 |
| 2 | Propoxylated Glycerine, Mw 450 (VORANOL CP450) | 7.46 |
| 3 | Polypropylene glycol, Mw 430 (VORANOL 220-260) | 97.40 |
| 4 | Benzoyl chloride | 0.10 |

1. (As in Example 12)
2. Item 2 was charged to the reactor and the resin mixture was heated to 80° C.
3. Item 3 was added over 30 min while maintaining the temperature at 80-85° C.

4. The resin mixture was held at 80° C. for 2 hours.
5. The % NCO was monitored until it was 15.0±0.3%.
6. The resin was cooled to 50-60° C., item 4 added with stirring, then the solution was filtered and packaged The final resin had the following properties: 100.00% Solids, % NCO 14.8%. Viscosity shown in table below.

| Temp, ° C. | Viscosity, mPas |
|---|---|
| 25 | 20,070 |
| 35 | 6875 |
| 45 | 2475 |
| 55 | 1225 |
| 65 | 650 |
| 75 | 400 |
| 80 | 325 |

At 85% solids viscosity was 375 mPas.

Example 18

Preparation of Coreactant

| Item | Monomer/Intermediate | Charge (g) |
|---|---|---|
| 1 | 4,4'-Diphenylmethane diisocyanate (Isonate 125M) | 200.00 |
| 2 | Propoxylated Glycerine, Mw 450 (Voranol CP450) | 15.75 |
| 3 | Polypropylene glycol, Mw 430 (Voranol 220-260) | 86.99 |
| 4 | Benzoyl chloride | 0.10 |

1. (As in Example 12)
2. Item 2 was charged to the reactor and the resin mixture was heated to 60° C.
3. Item 3 was added over 30 min while maintaining the temperature at 60-70° C.
4. The resin mixture was heated to 75-80° C. at held at this temperature for 2 hours.
5. The % NCO was monitored until it was 15.0±0.3%.
6. The resin was cooled to 50-60° C., item 4 added with stirring, then the solution was filtered and packaged The final resin had the following properties: 100.00% Solids, % NCO 14.9%; viscosity 33,850 at 25° C. When diluted to 85% solids with ethyl acetate, viscosity was 510 mPas at 25° C.

Example 19

Preparation of Coreactant

| Item | Monomer/Intermediate | Charge (g) |
|---|---|---|
| 1 | 4,4'-Diphenylmethane diisocyanate (ISONATE 125M) | 200.00 |
| 2 | Propoxylated Glycerine, Mw 450 (VORANOL CP450) | 23.01 |
| 3 | Polypropylene glycol, Mw 430 (VORANOL 220-260) | 77.86 |
| 4 | Benzoyl chloride | 0.10 |
| 5 | Ethyl Acetate | 53.1 |

1. (As in Example 12)
2. Item 2 was charged to the reactor and the resin mixture was heated to 60° C.
3. Item 3 was added over 30 min while maintaining the temperature at 60-70° C.
4. The resin mixture was heated to 75-80° C. at held at this temperature for 2 hours.
5. The % NCO was monitored until it was 15.0±0.3%.
6. The resin was cooled to 50-60° C., item 4 & 5 were added. The solution was stirred for 15 minutes then filtered and packaged The final resin had the following properties: 100% Solids, % NCO 15.2% and Viscosity of 45,050 mPas at 25° C. At 85% solids viscosity was 551 mPas at 25° C.

Example 20

Preparation of Coreactant

| Item | Monomer/Intermediate | Charge (g) |
|---|---|---|
| 1 | 4,4'-Diphenylmethane diisocyanate (ISONATE 125M) | 200.00 |
| 2 | Propoxylated Glycerine, Mw 450 (VORANOL CP450) | 39.46 |
| 3 | Polypropylene glycol, Mw 430 (VORANOL 220-260) | 57.20 |
| 4 | Benzoyl chloride | 0.10 |
| 5 | Ethyl Acetate | 52.4 |

1. (As in Example 12)
2. Item 2 was charged to the reactor and the resin mixture was heated to 60° C.
3. Item 3 was added over 30 min while maintaining the temperature at 70-80° C.
4. The resin mixture was held at 65-75° C. for 2 hours.
5. The % NCO was monitored until it was 15.0±0.3%.
6. The resin was cooled to 50-60° C., item 4 & 5 were added. The solution was stirred for 15 minutes then filtered and packaged.

The final resin had the following properties: 100% Solids, % NCO 14.6% and Viscosity of 114,400 mPas at 25° C.

Example 21

Preparation of Coreactant

| Item | Monomer/Intermediate | Charge (g) |
|---|---|---|
| 1 | 4,4'-Diphenylmethane diisocyanate (ISONATE 125M) | 200.00 |
| 2 | Propoxylated Glycerine, Mw 450 (VORANOL CP450) | 13.68 |
| 3 | Polypropylene glycol, Mw 1000 | 46.86 |
| 4 | Polypropylene glycol, Mw 430 (VORANOL 220-260) | 56.24 |
| 5 | Benzoyl chloride | 0.10 |

1. (As in Example 12)
2. Item 2 was charged to the reactor and the resin mixture was heated to 60° C.
3. Items 3 and 4 were added over 30 min while maintaining the temperature at 60-70° C.
4. The resin mixture heated to 80° C. and held at this temperature for 2 hours.
5. The % NCO was monitored until it was 15.0±0.3%.

6. The resin was cooled to 50-60° C., then item 5 added. The product was stirred for 15 minutes then packaged. The final resin had the following properties: 14.6% NCO.

Example 22

Preparation of Coreactant

| Item | Monomer/Intermediate | Charge (g) |
|---|---|---|
| 1 | 4,4'-Diphenylmethane diisocyanate (ISONATE 125M) | 200.00 |
| 2 | Polypropylene glycol (1020 Mwt) VORANOL 220-110N | 159.08 |
| 3 | Benzoyl chloride | 0.10 |
| 4 | Ethyl acetate | 63.4 |

1. (As in Example 12)
2. Item 2 was charged to the reactor. The hazy two-phase resin mixture was heated to 70° C. over 30 minutes. During this time, the mixture became clear and homogeneous.
3. The resin mixture heated to 80°-85° C. and held at this temperature for 2 hours.
4. The % NCO was monitored until it was 15.0±0.3%.
5. The resin was cooled to 50-60° C., items 3 & 4 were added. The solution was stirred for 15 minutes then filtered and packaged.

The final resin had the following properties: At 100.00% Solids, % NCO 14.9%

Example 23

Preparation of Coreactant

| Item | Monomer/Intermediate | Charge (g) |
|---|---|---|
| 1 | 4,4'-Diphenylmethane diisocyanate (ISONATE 125M) | 100.0 |
| 2 | Ethyl Acetate | 46.2 |
| 3 | Trimethylolpropane | 4.08 |
| 4 | Polypropylene glycol, Mw 430 (VORANOL 220-260) | 30.48 |
| 5 | Dipropylene glycol | 4.08 |
| 6 | Benzoyl chloride | 0.1 |

1. (As in Example 12)
2. Item 2 & 3 were charged to the reactor and the resin mixture was heated to 75° C.
3. Item 4 was added over 30 min. The reaction temperature was maintained at 75 to 85° C. during the addition.
4. Item 5 was added.
5. The reaction mixture was held at 80° C. for 2 hours.
6. The % NCO was monitored until it was 12.6±0.3%.
7. The resin was cooled to 50-60° C., item 6 was added. The solution was stirred for a few minutes, filtered and packaged.

In-process % NCO, 12.7%.

Example 24

Polyester STEPANPOL PS 3152

The polyester polyol STEPANPOL PS3152 from Stepan Company was used to make coreactant. The Stepan product bulletin reports the following properties. Hydroxyl number, 300-330 mg KOH/g, Acid Value 2.0-3.0 mg KOH/g; Viscosity at 25° C., 2,677; Specific gravity 1.24.

Example 25

Preparation of Coreactant

| Item | Monomer/Intermediate | Charge (g) |
|---|---|---|
| 1 | 4,4'-Diphenylmethane diisocyanate, mixed isomers (ISONATE OP 50, Dow Chemical Company) | 200.0 |
| 2 | STEPANPOL PD 56 (diethylene glycol/phthalic anhydride polyester with hydroxyl number 56, Stepan Chemical Company) | 193.8 |
| 3 | Ethyl Acetate | 69.5 |
| 4 | Benzoyl chloride | 0.1 |

1. (As in Example 12)
2. Item 2 was added to the reactor and the mixture was gradually heated to 70-80° C. over 30 minutes.
3. The reaction mixture was held at 80° C. for 1 hour.
4. The % NCO was monitored until it was 15.0±0.3%.
5. The resin was cooled to 50-60° C., items 3 and 4 were added. The solution was stirred for a few minutes, filtered and packaged.

In-process sample: 15.0% NCO. Finished product: 84.15% solids. The product was a clear yellow solution.

Example 26

Preparation of Coreactant

| Item | Monomer/Intermediate | Charge (g) |
|---|---|---|
| 1 | 4,4'-Diphenylmethane diisocyanate, mixed isomers (ISONATE OP 50, Dow Chemical Company) | 200.0 |
| 2 | STEPANPOL PS3152 (diethylene glycol/phthalic anhydride polyester with hydroxyl number 315, Stepan Chemical Company) | 193.8 |
| 3 | Ethyl Acetate | 69.5 |
| 4 | Benzoyl chloride | 0.1 |

1. (As in Example 12)
2. Item 2 was added to the reactor and the mixture was gradually heated to 80-90° C. over 30 minutes.
3. The reaction mixture was held at 80° C. for 1 hour.
4. The % NCO was monitored until it was 15.0±0.3%.
5. The resin was cooled to 50-60° C.; items 3 and 4 were added. The solution was stirred for a few minutes, filtered and packaged.

In-process sample: 14.7% NCO, Viscosity, 851 Pas at 25 C, 3.83 Pas at 60 C. Finished product: 83.9% solids. The product was a clear yellow solution.

Example 27

Preparation of Coreactant

| Item | Monomer/Intermediate | Charge (g) |
|---|---|---|
| 1 | 4,4'-Diphenylmethane diisocyanate (ISONATE 125M) | 50 |
| 2 | Ethyl acetate | 40 |
| 3 | Trimethylolpropane | 1.96 |
| 4 | CARBOWAX PEG 400 | 26.5 |

1. (As in Example 12)
2. Items 2 and 3 were added to the reactor and the mixture was gradually heated to 75-80° C.
3. Item 4 was added gradually over 30 minutes while maintaining the temperature at 75-80° C.
4. The reaction mixture was held at 80° C. for 1 hour.
5. The product was cooled to 50-60° C., filtered and packaged.

The finished product had the following properties: 63.8% solids, 7.7% NCO, viscosity 116 mPas at 25° C.

Example 28

Preparation of Coreactant

| Item | Monomer/Intermediate | Charge (g) |
|---|---|---|
| 1 | 4,4'-Diphenylmethane diisocyanate (ISONATE 125M) | 50.0 |
| 2 | Trimethylolpropane | 4.25 |
| 3 | Ethyl acetate | 73.4 |
| 4 | CARBOWAX PEG 400 | 19.1 |
| 5 | Benzoyl chloride | 0.1 |

1. (As in Example 12)
2. Items 2 and 3 were added to the reactor and the mixture was gradually heated to 75-80° C.
3. Item 4 was added gradually over 30 minutes while maintaining the temperature at 75-80° C.
4. The reaction mixture was held at 80° C. for 1 hour.
5. The product was cooled to 50-60° C. Item 5 was added with stirring for a few minutes, then the product was filtered and packaged.

In-process sample 69.5% solids, 8.4% NCO.

Example 29

Preparation of Coreactant

| Item | Monomer/Intermediate | Charge (g) |
|---|---|---|
| 1 | 4,4'-Diphenylmethane diisocyanate (ISONATE 125M) | 50.0 |
| 2 | Trimethylolpropane | 3.44 |
| 3 | Ethyl Acetate | 30.0 |
| 4 | Polypropylene glycol, Mw 430 (VORANOL 220-260) | 15.44 |
| 5 | Benzoyl chloride | 0.15 |

1. (As in Example 12)
2. Items 2 & 3 were charged to the reactor and the resin mixture was heated to 80° C.
3. Item 4 was added over 30 min while maintaining the reaction temperature at 80-85° C.
4. The resin mixture was held at 80° C. for 2 hours.
5. The resin was cooled to 50-60° C., item 5 added with stirring, then the solution was filtered and packaged.

The final resin had the following properties: 78.7% solids, 11.8% NCO

Example 30

Coreactant

DESMODUR L75, TDI based polyisocyanate from Bayer Material Science LLC, was tested. The Bayer product data sheet reports the following properties. 13.3±0.4% NCO; 75% solids; Viscosity 1,600±400 mPas.

Example 31

Preparation of Coreactant

| Item | Monomer/Intermediate | Charge (g) |
|---|---|---|
| 1 | 4,4'-Diphenylmethane diisocyanate (ISONATE 125M) | 50.0 |
| 2 | Trimethylolpropane | 4.75 |
| 3 | Ethyl Acetate | 28.4 |
| 4 | Polypropylene glycol, Mw 430 (VORANOL 220-260) | 11.45 |
| 5 | Benzoyl chloride | 0.1 |

1. (As in Example 12)
2. Items 2 & 3 were charged to the reactor and the resin mixture was heated to 80° C.
3. Item 4 was added over 30 min while maintaining the reaction temperature at 80-85° C.
4. The resin mixture was held at 80° C. for 2 hours.
5. The resin was cooled to 50-60° C., item 5 added with stirring, then the solution was filtered and packaged.

The final resin had the following properties: 76.1% solids, 11.0% NCO

Example 32

Preparation of Coreactant

| Item | Monomer/Intermediate | Charge (g) |
|---|---|---|
| 1 | 4,4'-Diphenylmethane diisocyanate (ISONATE 125M) | 50.0 |
| 2 | Trimethylolpropane | 2.28 |
| 3 | Ethyl Acetate | 30.5 |

-continued

| Item | Monomer/Intermediate | Charge (g) |
|---|---|---|
| 4 | Polypropylene glycol, Mw 430 (VORANOL 220-260) | 18.9 |
| 5 | Benzoyl chloride | 0.1 |

1. (As in Example 12)
2. Items 2 & 3 were charged to the reactor and the resin mixture was heated to 80° C.
3. Item 4 was added over 30 min while maintaining the reaction temperature at 80-85° C.
4. The resin mixture was held at 80° C. for 2 hours.
5. The resin was cooled to 50-60° C., item 5 added with stirring, then the solution was filtered and packaged.

The final resin had the following properties: 73.6% Solids, % NCO 11.2%.

Example 33

Preparation of Coreactant

| Item | Monomer/Intermediate | Charge (g) |
|---|---|---|
| 1 | 4,4'-Diphenylmethane diisocyanate (ISONATE 125M) | 100 |
| 2 | Ethyl Acetate | 65 |
| 3 | Polypropylene glycol, Mw 430 (VORANOL 220-260) | 51.7 |
| 4 | Benzoyl chloride | 0.1 |

1. (As in Example 12)
2. Item 2 was charged to the reactor and the resin mixture was heated to 75° C.
3. Item 3 was added over 30 min while maintaining the reaction temperature at 80-85° C.
4. The resin mixture was held at 80° C. for 2 hours.
5. The resin was cooled to 50-60° C., item 4 added with stirring, then the solution was filtered and packaged.

The final resin had the following properties: 74.4% Solids, % NCO 11.4%.

Example 34

Preparation of Coreactant

| Item | Monomer/Intermediate | Charge (g) |
|---|---|---|
| 1 | 4,4'-Diphenylmethane diisocyanate (ISONATE 125M) | 100 |
| 2 | Trimethylolpropane | 11.4 |
| 3 | Ethyl Acetate | 55.1 |
| 4 | Polypropylene glycol, Mw 430 (VORANOL 220-260) | 17.1 |
| 5 | Benzoyl chloride | 0.1 |

1. (As in Example 12)
2. Items 2 & 3 were charged to the reactor and the resin mixture was heated to 80° C.
3. Item 4 was added over 30 min while maintaining the reaction temperature at 80-85° C.
4. The resin mixture was held at 80° C. for 2 hours.
5. The resin was cooled to 50-60° C., item 5 added with stirring, then the solution was filtered and packaged.

The final resin had the following properties: 76.0% Solids, % NCO 11.3%.

Example 35

Preparation of Coreactant

| Item | Monomer/Intermediate | Charge (g) |
|---|---|---|
| 1 | 4,4'-Diphenylmethane diisocyanate (ISONATE 125M) | 100 |
| 2 | Trimethylolpropane | 3.14 |
| 3 | Ethyl Acetate | 32.0 |
| 4 | Polypropylene glycol, Mw 430 (VORANOL 220-260) | 42.2 |
| 5 | Benzoyl chloride | 0.1 |

1. (As in Example 12)
2. Items 2 & 3 were charged to the reactor and the resin mixture was heated to 80° C.
3. Item 4 was added over 30 min while maintaining the reaction temperature at 80-85° C.
4. The resin mixture was held at 80° C. for 2 hours.
5. The resin was cooled to 50-60° C., item 5 added with stirring, then the solution was filtered and packaged.

The final resin had the following properties: 84.9% Solids, % NCO 12.7%.

Example 36

Preparation of Coreactant

| Item | Monomer/Intermediate | Charge (g) |
|---|---|---|
| 1 | 4,4'-Diphenylmethane diisocyanate (ISONATE 125M) | 100 |
| 2 | Trimethylolpropane | 2.6 |
| 3 | Ethyl Acetate | 60.8 |
| 4 | Polypropylene glycol, Mw 430 (VORANOL 220-260) | 35.2 |
| 5 | Dipropylene glycol | 3.9 |
| 6 | Benzoyl chloride | 0.1 |

1. (As in Example 12)
2. Items 2 & 3 were charged to the reactor and the resin mixture was heated to 80° C.
3. Items 4 & 5 were added over 30 min while maintaining the reaction temperature at 80-85° C.
4. The resin mixture was held at 80° C. for 2 hours.
5. The resin was cooled to 50-60° C., item 6 added with stirring, then the solution was filtered and packaged.

The final resin had the following properties: 83.5% Solids, % NCO 12.5%.

Example 37

Preparation of Coreactant

| Item | Monomer/Intermediate | Charge (g) |
|---|---|---|
| 1 | 4,4'-Diphenylmethane diisocyanate (ISONATE 125M) | 100 |
| 2 | Trimethylolpropane | 2.8 |
| 3 | Ethyl Acetate | 58.4 |

-continued

| Item | Monomer/Intermediate | Charge (g) |
|---|---|---|
| 4 | Polypropylene glycol, Mw 430 (VORANOL 220-260) | 25.1 |
| 5 | Dipropylene glycol | 8.4 |
| 6 | Benzoyl chloride | 0.1 |

1. (As in Example 12)
2. Items 2 & 3 were charged to the reactor and the resin mixture was heated to 80° C.
3. Items 4 & 5 were added over 30 min while maintaining the reaction temperature at 80-85° C.
4. The resin mixture was held at 80° C. for 2 hours.
5. The resin was cooled to 50-60° C., item 6 added with stirring, then the solution was filtered and packaged.

The final resin had the following properties: 75.3% Solids, % NCO 11.8%.

Example 38

Preparation of Coreactant

| Item | Monomer/Intermediate | Charge (g) |
|---|---|---|
| 1 | 4,4'-Diphenylmethane diisocyanate (ISONATE 125M) | 100 |
| 2 | Trimethylolpropane | 4.6 |
| 3 | Ethyl Acetate | 60.5 |
| 4 | Polypropylene glycol, Mw 430 (VORANOL 220-260) | 35.5 |
| 5 | Dipropylene glycol | 1.0 |
| 6 | Benzoyl chloride | 0.1 |

1. (As in Example 12)
2. Items 2 & 3 were charged to the reactor and the resin mixture was heated to 80° C.
3. Items 4 & 5 were added over 30 min while maintaining the reaction temperature at 80-85° C.
4. The resin mixture was held at 80° C. for 2 hours.
5. The resin was cooled to 50-60° C., item 6 added, with stirring, then the solution was filtered and packaged.

The final resin had the following properties: 83.9% Solids, % NCO 12.9%.

Example 39

Preparation of Coreactant

| Item | Monomer/Intermediate | Charge (g) |
|---|---|---|
| 1 | 4,4'-Diphenylmethane diisocyanate (ISONATE 125M) | 100 |
| 2 | Ethyl Acetate | 30 |
| 3 | Polypropylene glycol, Mw 430 (VORANOL 220-260) | 43.8 |
| 4 | Dipropylene glycol | 3.7 |
| 5 | Benzoyl chloride | 0.1 |

1. (As in Example 12)
2. Items 2 was charged to the reactor and the resin mixture was heated to 80° C.
3. Items 3 and 4 were added over 30 min while maintaining the reaction temperature at 80-85° C.
4. The resin mixture was held at 80° C. for 2 hours.
5. The resin was cooled to 50-60° C., item 5 added with stirring, then the solution was filtered and packaged.

The final resin had the following properties: 84.9% Solids, % NCO 14.2%.

Example 40

Preparation of Coreactant

| Item | Monomer/Intermediate | Charge (g) |
|---|---|---|
| 1 | 4,4'-Diphenylmethane diisocyanate (ISONATE 125M) | 200 |
| 2 | Polypropylene glycol, Mw 430 (VORANOL 220-260) | 87.8 |
| 3 | Castor Oil | 23.5 |
| 4 | Ethyl Acetate | 54.9 |
| 5 | Benzoyl chloride | 0.1 |

1. (As in Example 12)
2. Items 2 & 3 were charged to the reactor and the resin mixture was gradually heated to 80° C.
3. The resin mixture was held at 80° C. for 2 hours.
4. The resin was cooled to 50-60° C., items 4 and 5 were added with stirring; the solution was filtered and packaged.

The final resin had the following properties: Before adding solvent; 15.0% NCO; After adding solvent: 84.9% Solids.

Example 41

Preparation of Coreactant

| Item | Monomer/Intermediate | Charge (g) |
|---|---|---|
| 1 | 4,4'-Diphenylmethane diisocyanate (ISONATE 125M) | 100 |
| 2 | Mixed MDI isomers (ISONATE OP 50) | 100 |
| 3 | Polypropylene glycol, Mw 430 (VORANOL 220-260) | 97.4 |
| 4 | Propoxylated Glycerine, Mw 450 (VORANOL CP450) | 7.46 |
| 5 | Ethyl Acetate | 54 |
| 6 | Benzoyl chloride | 0.1 |

1. (Items 1 & 2 added as in Example 12)
2. Items 3 and 4 were charged to the reactor and the resin mixture was gradually heated to 80° C.
3. The resin mixture was held at 80° C. for 2 hours.
4. The resin was cooled to 50-60° C., items 5 and 6 were added with stirring, then the solution was filtered and packaged.

The final resin had the following properties: before adding solvent, 14.7% NCO; after adding solvent, 84.5% Solids.

Example 42

Laminate Preparation and Testing

Films tested were polyester (92LBT), polyethylene (GF10 and GF19) and aluminum foil reinforced by laminating to polyester film (PET-Al) (adhesive applied to aluminum).

Samples of the films were cut into 9"×12" (22.9×30.5 cm) sections. Films requiring corona treatment were treated to obtain a surface energy of 36 dynes or higher. The secondary film was placed on the rubber pad of the laminator (treated side up). The two components of the adhesive were combined and diluted to 50% solids. The primary film was attached to a hard flat surface (treated side up). The adhesive was applied to the aluminum side of the PET-Al laminate or to polyester film with a Meyer #6 wire wound rod (primary film). The coat weight was approximately (2.75-3.0 g/m$^2$). If necessary, the adhesive concentration was adjusted to obtain the target coat weight. The solvent was evaporated from the adhesive by placing the coated film in an 80° C. forced air oven for 30 seconds. The primary film was removed from the plate and the top edge of the film (adhesive side down) mated to the top of the secondary film on the laminator pad. The oil heated roller of the laminator was passed over the films pulling the primary film in contact with the secondary film and laminating the two films together. The initial or "green" bonds were tested as soon as possible after the laminate was made. The 90° T-peel test was done on laminate samples cut to 15 mm or 25 mm (1 inch) wide strips and pulled at a rate of 10"/min (25.4 cm/min). Conversion factors were used as necessary to report bond values as N/15 mm Some laminates were prepared on a Egan laminator with a gravure cylinder. Drying oven temperatures were 170-180° F. (77-82° C.). Nip roll temperature was 180-200° F. (82-93° C.). The line speed was 150-600 feet/minute (45.7-183 m/min)

Laminate Test Results.
Example 3 is a polyester made with phthalic anhydride (PA) as the sole acid component.
Table 1 shows that combining this polyester with the appropriate prepolymers made from MDI and low molecular weight polyether polyols gives adhesive formulations with low viscosity and excellent green strength.
Table 2 shows that further reduction of the molecular weight of the PA/DEG polyester gives lower viscosity adhesives which still have good green strength. Example 30 is a low molecular weight isocyanate terminated product based on TDI. Using this as a coreactant gives good green bonds and acceptable viscosity
Table 3 shows that even lower mole weight PA/DEG polyesters will give good green bond and low viscosity with a wide range of prepolymers made from low molecular weight polyols.
Table 4 shows that coreactant prepolymers made using the triol CP 450 give good results over a range of mix ratios. Also, mixed isomers of MDI may be used. Prepolymers made from polyesters and MDI mixed isomers gave bonds and low viscosity.
Table 5 further illustrates PA/DEG polyesters and coreactants that give good results.
Table 6 shows that small amounts of other acids such as adipic acid may be used in the polyester. But, reducing the percent of phthalic anhydride in the polyester reduces green strength. Also, other diols such as hexanediol may be used in place of DEG. Triols, such as castor oil may be included in the polyester portion of the adhesive.

TABLE 1

Laminates made with low viscosity polyester (OHN 25)

| Part A (Polyester, OHN 25) | Ex. 3 | Ex. 3 | Ex. 3 | Ex. 3 | Ex. 3 | Ex. 3 |
|---|---|---|---|---|---|---|
| Part B (Prepolymer) | Ex. 31 | Ex. 33 | Ex. 34 | Ex. 35 | Ex. 38 | Ex. 39 |
| Isocyanate (4-,4'-MDI) | | | | | | |
| Polyols in prepolymer (Percent of total OH equivalents) | | | | | | |
| PPG* (430 mole wt) | 35 | 100 | 25 | 75 | 61 | 80 |
| TMP* | 65 | | 75 | 25 | 36 | |
| DPG* | | | | | 3 | 20 |
| Mixed Adhesive | | | | | | |
| Equivalents NCO/OH | 1.2 | 1.2 | 1.2 | 1.2 | 1.2 | 1.2 |
| % solids | 50 | 50 | 50 | 50 | 50 | 50 |
| mixed viscosity (mPas @ 25 C.) | 60 | 37 | 48 | 41 | 46 | 41 |
| Laminations | | | | | | |
| 90 Degree T-Peel Results (N/15 mm) | | | | | | |
| 92LBT/GF19 | | | | | | |
| Green | 2.73 AS | 1.92 AS | 1.99 AS | 2.56 AS | 2.65 AS | 2.00 AS |
| 1 d | 7.20 DES | 5.53 DES | 4.63 DES | 6.70 DES | 5.63 DES | 3.80 AS |
| 7 d | 4.92 DES | 5.16 DES | 3.71 AT | 5.68 DES | 5.00 DES | 5.26 DES |
| PET-AL/GF19 | | | | | | |
| Green | 2.61 AS | 2.29 AS | 2.61 AS | 2.84 AS | 2.46 AS | 2.78 AS |
| 1 d | 6.28 DES | 3.95 DES | 2.44 AT | 7.23 DES | 7.04 DES | 5.64 DES |
| 7 d | 4.73 DES | 4.85 DES | 3.80 AT | 5.17 DES | 5.80 DES | 3.26 AS |

*PPG = Polypropylene glycol   AS Adhesive split (adhesive on both films);
*TMP = Trimethylolpropane   AT (adhesive transfer from primary film to secondary);
*DPG = Dipropyleneglycol   DES (film breaks or tears)

| Part A (Polyester, OHN 25) | Example 3 | Example 3 | Example 3 | Example 3 |
|---|---|---|---|---|
| Part B (Prepolymer) | Example 23 | Example 12 | Example 13 | Example 30 |
| Isocyanate | 4-,4'-MDI | 4-,4'-MDI | 4-,4'-MDI | TDI |
| Polyols in prepolymer (Percent of total OH equivalents) | | | | |
| PPG 430 | 50 | 65 | 50 | |
| TMP | 30 | 15 | 50 | |
| DPG | 20 | 20 | | |
| Mixed Adhesive | | | | |
| Equivalents NCO/OH | 1.2 | 1.2 | 1.2 | 1.2 |
| % solids | 50 | 50 | 50 | 50 |
| Mixed Viscosity (mPas at 25 C.) | 43 | 38 | 45 | 55 |
| Laminations | | | | |

TABLE 1-continued

| 90 Degree T-Peel Results (N/15 mm) | | | | |
|---|---|---|---|---|
| 92LBT/GF19 | | | | |
| Green | 2.26 AS | 2.09 AS | 2.71 AS | 2.43 AS |
| 1 d | 5.86 DES | 5.27 AS | 7.56 DES | 4.87 AS |
| 7 d | 5.80 DES | 5.75 DES | 5.35 DES | 5.68 DES |
| PET-AL/GF19 | | | | |
| Green | 2.43 AS | 2.42 AS | 2.44 AS | 2.91 AS |
| 1 d | 7.55 DES | 5.67 DES | 6.29 DES | 6.27 AS |
| 7 d | 6.83 DES | 5.47 DES | 5.25 DES | 5.89 DES |

AS Adhesive split (adhesive on both films);
AT (adhesive transfer from primary film to secondary);
DES (film breaks or tears)

TABLE 2

| Laminates made with low viscosity polyester (OHN 35) | | | | | | | |
|---|---|---|---|---|---|---|---|
| Part A (Polyester, OH# 35) | Ex. 1 | Ex. 1 | Ex. 1 | Ex. 1 | Ex. 1 | Ex. 1 | Ex. 1 |
| Part B (Prepolymer) Isocyanate (4-,4'-MDI) | Ex. 31 | Ex. 33 | Ex. 34 | Ex. 35 | Ex. 38 | Ex. 39 | Ex. 23 |
| Polyols in prepolymer (Percent of total OH equivalents) | | | | | | | |
| PPG 430 | 35 | 100 | 25 | 75 | 61 | 80 | 50 |
| TMP | 65 | | 75 | 25 | 36 | | 30 |
| DPG | | | | | 3 | 20 | 20 |
| Mixed Adhesive | | | | | | | |
| Equivalents NCO/OH | 1.2 | 1.2 | 1.2 | 1.2 | 1.2 | 1.2 | 1.2 |
| % solids | 50 | 50 | 50 | 50 | 50 | 50 | 50 |
| Mixed Viscosity (mPas at 25 C.) | 47 | 30 | 34 | 38 | 33 | 34 | 34 |
| Laminations | | | | | | | |
| 90 Degree T-Peel Results (N/15 mm) | | | | | | | |
| 92LBT/GF19 | | | | | | | |
| Green | 1.86 AS | 1.92 AS | 2.15 AS | 2.03 AS | 2.16 AS | 1.80 AS | 2.28 AS |
| 1 d | 5.17 DES | 5.08 DES | 4.73 DES | 7.18 DES | 4.17 DES | 6.35 DES | 4.82 DES |
| 7 d | 4.72 DES | 4.90 DES | 4.88 DES | 4.64 DES | 5.13 DES | 4.74 DES | 4.70 DES |
| PET-AL/GF19 | | | | | | | |
| Green | 2.07 AS | 1.84 AS | 2.09 AS | 1.68 AS | 1.96 AS | 1.79 AS | 1.92 AS |
| 1 d | 7.56 DES | 5.26 DES | 3.00 AF | 6.15 DES | 3.67 DES | 6.21 DES | 4.86 DES |
| 7 d | 5.22 DES | 5.17 AT | 5.05 DES | 5.40 DES | 7.09 DES | 4.73 DES | 5.71 DES |
| Part A (Polyester, OHN 35) | Ex. 1 | Ex. 1 | Ex. 1 | Ex. 1 | Ex. 1 | Ex. 1 | |
| Part B (Prepolymer) Isocyanate (4-,4'-MDI) | Ex. 12 | Ex. 13 | Ex. 16 | Ex. 30 TDI | Ex. 14 | Ex. 14 | |
| Polyols in prepolymer (Percent of total OH equivalents) | | | | | | | |
| PPG 430 | 65 | 50 | 95 | | 90 | 90 | |
| TMP | 15 | 50 | | | 10 | 10 | |
| DPG | 20 | | | | | | |
| VORANOL CP450 (triol) | | | 5 | | | | |
| Mixed Adhesive | | | | | | | |
| Equivalents NCO/OH | 1.2 | 1.2 | 1.2 | 1.2 | 1.1 | 1.3 | |
| % solids | 50 | 50 | 50 | 50 | 50 | 50 | |
| Mixed Viscosity (mPas at 25 C.) | 34 | 35 | 33 | 43 | 32 | 35 | |
| Laminations | | | | | | | |
| 90 Degree T-Peel Results (N/15 mm) | | | | | | | |
| 92LBT/GF19 | | | | | | | |
| Green | 2.33 AS | 2.36 AS | 1.19 AS | 2.26 AS | 1.96 AS | 1.67 AS | |
| 1 d | 5.70 DES | 5.20 DES | 4.65 DES | 7.48 DES | 5.62 DES | 5.16 DES | |
| 7 d | 4.11 DES | 4.64 DES | 5.58 DES | 3.68 DES | | | |
| PET-AL/GF19 | | | | | | | |
| Green | 2.15 AS | 2.13 AS | 1.55 AS | 2.35 AS | 2.05 AS | 2.09 AS | |
| 1 d | 6.55 DES | 6.09 DES | 6.44 DES | 7.41 DES | 5.63 DES | 5.83 DES | |
| 7 d | 5.04 DES | 3.98 DES | 5.21 DES | 4.51 DES | | | |

AS Adhesive split (adhesive on both films);
AT (adhesive transfer from primary film to secondary);
DES (film breaks or tears)

TABLE 3

Laminates made with low viscosity polyester (OHN 56)

| Part A Polyester (OHN 56) | Ex. 2 | Ex. 2 | Ex. 2 | Ex. 2 | Ex. 2 | Ex. 2 | Ex. 2 |
|---|---|---|---|---|---|---|---|
| Part B prepolymer Isocyanate (4-,4'-MDI) | Ex. 29 | Ex. 31 | Ex. 32 | Ex. 33 | Ex. 34 | Ex. 35 | Ex. 36 |
| *Polyols in prepolymer (Percent of total OH equivalents)* | | | | | | | |
| PPG 430 | 50 | 35 | 65 | 100 | 25 | 75 | 50 |
| TMP | 50 | 65 | 35 | | 75 | 25 | 20 |
| DPG | | | | | | | 20 |
| Mixed Adhesive | | | | | | | |
| Equivalents NCO/OH | 1.2 | 1.2 | 1.2 | 1.2 | 1.2 | 1.2 | 1.2 |
| % solids | 50 | 50 | 50 | 50 | 50 | 50 | 50 |
| Mixed Viscosity (mPas at 25 C.) | 23 | 33 | 33 | 30 | 31 | 26 | 23 |
| *Laminations — 90 Degree T-Peel Results (N/15 mm)* | | | | | | | |
| 92LBT/GF19 | | | | | | | |
| Green | 1.47 AS | 1.22 AS | 1.35 AS | 0.66 AS | 2.41 AS | 1.06 AS | 1.58 AS |
| 1 d | 0.97 AS | 1.74 AS | 3.96 DES | 7.14 DES | 3.35 DES | 7.00 DES | 3.20 DES |
| 7 d | 1.11 AF | 1.03 AF | 3.03 DES | 5.00 DES | 2.90 DES | 2.01 DES | 5.50 DES |
| PET-AL/GF19 | | | | | | | |
| Green | 1.69 AS | 1.21 AS | 0.99 AS | 0.58 AS | 1.76 AS | 0.76 AS | 0.92 AS |
| 1 d | 1.71 AS | 1.67 AS | 4.97 DES | 9.09 DES | 3.48 DES | 3.81 DES | 4.81 DES |
| 7 d | 2.47 AT | 1.63 AF | 2.78 DES | 5.18 DES | 2.74 DES | 5.04 DES | 5.08 DES |

| Part A Polyester (OHN 56) | Ex 2 | Ex 2 | Ex 2 | Ex 2 | Ex 2 | Ex 2 | Ex 2 | Ex 2 |
|---|---|---|---|---|---|---|---|---|
| Part B prepolymer | Ex 38 | Ex 39 | Ex 23 | Ex 12 | Ex 13 | Ex 30 | Ex 27 | Ex 28 |
| Isocyanate | 4-,4'-MDI | 4-,4'-MDI | 4-,4'-MDI | 4-,4'-MDI | 4-,4'-MDI | TDI | 4-,4'-MDI | 4-,4'-MDI |
| *Polyols in prepolymer (Percent of total OH equivalents)* | | | | | | | | |
| PPG 430 | 61 | 80 | 50 | 65 | 50 | | | |
| TMP | 36 | 20 | 30 | 15 | 50 | | 25 | 50 |
| DPG | 3 | | 20 | 20 | | | | |
| PEG 400 | | | | | | | 75 | 50 |
| Mixed Adhesive | | | | | | | | |
| Equivalents NCO/OH | 1.2 | 1.2 | 1.2 | 1.2 | 1.2 | 1.2 | 1.2 | 1.2 |
| % solids | 50 | 50 | 50 | 50 | 50 | 50 | 50 | 50 |
| Mixed Viscosity (mPas at 25 C.) | 27 | 25 | 25 | 26 | 24 | 31 | 32 | 28 |
| *Laminations — 90 Degree T-Peel Results (N/15 mm)* | | | | | | | | |
| 92LBT/GF19 | | | | | | | | |
| Green | 1.73 AS | 1.27 AS | 1.57 AS | 1.29 AS | 1.80 AS | 2.31 AS | 0.81 AS | 0.92 AS |
| 1 d | 4.62 DES | 4.79 AS | 3.18 AS | 5.30 DES | 6.98 DES | 7.67 DES | 2.47 AS | |
| 7 d | 4.63 DES | 4.76 DES | 4.05 DES | 4.05 DES | 3.53 DES | 3.70 DES | 0.73 AF | 0.94 AS |
| PET-AL/GF19 | | | | | | | | |
| Green | 2.10 AS | 0.97 AS | 1.41 AS | 0.78 AS | 1.36 AS | 2.04 AS | 0.89 AS | 1.30 AS |
| 1 d | 4.06 DES | 4.67 DES | 4.79 AT | 4.83 DES | 4.25 AT | 4.13 DES | 1.89 AS | |
| 7 d | 4.64 DES | 4.60 DES | 4.78 DES | 5.66 DES | 4.66 DES | 1.19 AT | 1.81 AS | 1.91 AS |

| Part A Polyester (OHN 56) | Ex 2 | Ex 2 | Ex 2 | Ex 2 | Ex 2 | Ex 2 |
|---|---|---|---|---|---|---|
| Part B prepolymer Isocyanate (4-,4'-MDI) | Ex 29 | Ex 31 | Ex 32 | Ex 33 | Ex 34 | Ex 35 |
| *Polyols in prepolymer (Percent of total OH equivalents)* | | | | | | |
| PPG 430 | 50 | 35 | 65 | 100 | 25 | 75 |
| TMP | 50 | 65 | 35 | | 75 | 25 |
| Mixed Adhesive | | | | | | |
| Equivalents NCO/OH | 1.0 | 1.0 | 1.0 | 1.0 | 1.0 | 1.0 |
| % solids | 50 | 50 | 50 | 50 | 50 | 50 |

TABLE 3-continued

Laminates made with low viscosity polyester (OHN 56)

| | | | | | | |
|---|---|---|---|---|---|---|
| Mixed viscosity (mPas 25 C.) Laminations | 31 | 30 | 33 | 26 | 30 | 26 |

90 Degree T-Peel Results (N/15 mm)

| | | | | | | |
|---|---|---|---|---|---|---|
| 92LBT/GF19 | | | | | | |
| Green | 1.35 AS | 1.01 AS | 1.40 AS | 0.88 AS | 1.92 AS | 0.93 AS |
| 1 d | 1.77 AS | 1.24 AS | 4.58 DES | 4.63 DES | 3.70 DES | 7.48 DES |
| 7 d | 1.86 AT | 1.85 AT | 2.94 DES | 6.02 DES | 2.93 DES | 2.62 DES |
| PET-AL/GF 19 | | | | | | |
| Green | 1.15 AS | 1.32 AS | 0.89 AS | 0.65 AS | 2.03 AS | 0.84 AS |
| 1 d | 1.54 AS | 1.78 AS | 4.93 DES | 5.55 DES | 3.75 DES | 5.07 DES |
| 7 d | 1.85 AT | 1.93 AT | 3.27 DES | 3.75 DES | 2.74 DES | 2.95 DES |

AS Adhesive split (adhesive on both films);
AT (adhesive transfer from primary film to secondary);
DES (film breaks or tears)

TABLE 4

Laminates made with additional coreactants

| | | | | | | | | |
|---|---|---|---|---|---|---|---|---|
| Part A (Polyester, OH# 35) | Ex 5 | Ex 5 | Ex 5 | Ex 5 | Ex 5 | Ex 5 | Ex 5 | Ex 5 |
| Part B (Prepolymer) | Ex 17 | Ex 17 | Ex 18 | Ex 18 | Ex 19 | Ex 19 | Ex 30 | Ex 20 |
| Isocyanate (4-,4'-MDI) | | | | | | | TDI | |

Polyols in prepolymer (Percent of total OH equivalents)

| | | | | | | | | |
|---|---|---|---|---|---|---|---|---|
| PPG 430 | 90 | 90 | 80 | 80 | 70 | 70 | | 50 |
| VORANOL CP 450 | 10 | 10 | 20 | 20 | 30 | 30 | | 50 |
| PPG 1025 | | | | | | | | |
| Mixed Adhesive Equivalents NCO/OH | 1.2 | 1.3 | 1.2 | 1.3 | 1.2 | 1.3 | 1.2 | 1.2 |
| % solids | 50 | 50 | 50 | 50 | 50 | 50 | 50 | 50 |
| Mixed viscosity (mPas at 25 C.) Laminations | 29 | 25.7 | 23.7 | 26 | 24.8 | 23.8 | 26 | 27 |

90 Degree T-Peel Results (N/15 mm)

| | | | | | | | | |
|---|---|---|---|---|---|---|---|---|
| 92LBT/GF 19 | | | | | | | | |
| Green | 2.41 AS | 2.49 AS | 2.47 AS | 1.73 AS | 2.34 AS | 2.22 AS | 2.14 AS | 2.90 AS |
| 1 d | 5.65 DES | 5.94 DES | 5.87 DES | 6.22 DES | 6.29 DES | 6.50 DES | 6.66 DES | 6.03 DES |
| 7 d | 6.13 DES | 4.91 DES | 6.52 DES | 7.02 DES | 5.72 DES | 6.10 DES | 6.11 DES | 6.31 DES |
| PET-AL/GF 19 | | | | | | | | |
| Green | 2.72 AS | 2.78 AS | 2.62 AS | 2.03 AS | 2.44 AS | 1.99 AS | 2.77 AS | 3.62 AS |
| 1 d | 6.76 DES | 5.70 DES | 5.93 DES | 6.63 DES | 6.23 DES | 5.52 DES | 6.53 DES | 5.81 DES |
| 7 d | 6.37 DES | 5.75 DES | 6.90 DES | 7.08 DES | 6.35 DES | 6.34 DES | 6.65 DES | 5.76 DES |
| PET-AL/92LBT | | | | | | | | |
| Green | 2.35 AS | 2.29 AS | 2.25 AS | 1.38 AS | 1.20 AS | 1.31 AS | 2.57 AS | 3.07 AS |
| 1 d | 4.29 DES | 3.90 DES | 4.32 DES | 5.37 DES | 5.48 DES | 5.81 DES | 5.85 DES | 5.05 DES |
| 7 d | 4.94 DES | 4.18 DES | 5.03 DES | 5.63 DES | 3.24 DES | 6.11 DES | 3.56 DES | 5.13 DES |

| | | | | | | |
|---|---|---|---|---|---|---|
| Part A (Polyester, OH# 35) | Example 5 | Example 5 | Example 5 | Example 5 | Example 5 | Example 5 |
| Part B (Prepolymer) | Example 21 | Example 22 | Example 25 | Example 26 | Example 40 | Example 41 |
| Isocyanate | 4-,4'-MDI | 4-,4'-MDI | 50 OP* | 50 OP* | 4-,4'-MDI | 50 OP* |

Polyols in prepolymer (Percent of total OH equivalents)

| | | | | | | |
|---|---|---|---|---|---|---|
| PPG 430 | 60 | | | | 85 | 90 |
| VORANOL CP 450 | 20 | | | | | 10 |
| PPG 1025 | 20 | 100 | | | | |
| STEPANPOL PD 56 | | | 100 | | | |
| STEPANPOL PS 3152 | | | | 100 | | |
| Castor oil | | | | | 15 | |
| Mixed Adhesive Equivalents NCO/OH | 1.2 | 1.2 | 1.2 | 1.2 | 1.2 | 1.2 |
| % solids | | | | | | |

TABLE 4-continued

Laminates made with additional coreactants

| | | | | | | |
|---|---|---|---|---|---|---|
| Mixed viscosity mPas | 26.9 | 27.8 | 26.1 | 26.3 | 27.5 | 24.2 |
| % solids | 50 | 50 | 50 | 50 | 50 | 50 |
| Laminations 92LBT/GF 19 | | | | | | |
| Green | 2.36 AS | 0.23 AS | 1.63 AS | 2.17 AS | 0.87 AS | 1.40 AS |
| 1 d | 7.43 DES | 2.26 AS | 5.12 AS | 5.49 AS | 3.99 AS | 4.97 AS |
| 7 d | 6.56 DES | 4.72 AS | 5.26 DES | 5.80 AS | 4.29 AS | 4.62 AS |
| PET-AL/GF 19 | | | | | | |
| Green | 2.61 AS | 0.36 AS | 1.37 AS | 1.55 AS | 0.75 AS | 1.06 AS |
| 1 d | 7.17 DES | 1.79 AS | 4.80 AS | 6.20 AT | 3.92 AS | 6.71 DES |
| 7 d | 6.42 DES | 4.03 AS | 5.90 AS | 6.23 AS | 3.97 AS | 6.26 DES |
| PET-AL/92LBT | | | | | | |
| Green | 2.06 AS | 0.22 AS | 0.86 AS | 1.67 AS | 0.46 AS | 0.56 AS |
| 1 d | 5.53 DES | 2.29 AS | 3.64 AF | 4.35 AT | 3.37 AS | 3.09 AS |
| 7 d | 5.12 DES | 3.38 AS | 4.68 DES | 4.44 DES | 2.85 AS | 3.31 AS |

AS Adhesive split (adhesive on both films);
AT (adhesive transfer from primary film to secondary);
DES (film breaks or tears)
*50 OP = ISONATE 50 OP Dow Chemical Company) Mixed isomers of MDI

TABLE 5

Additional adhesive/laminate examples

| Part A (Polyester) | Ex 9 | Ex 9 | Ex 9 | Ex 9 | Ex 4 | Ex 4 | Ex 6 | Ex 4 |
|---|---|---|---|---|---|---|---|---|
| OH# | 23 | 23 | 23 | 23 | 40 | 40 | 37 | 40 |
| Part B (prepolymer) | Ex 33 | Ex 36 | Ex 17 | Ex 30 | Ex 14 | Ex 14 | Ex 17 | Ex 14 |
| Isocyanate (4-,4'-MDI) | | | | | TDI | | | |

Polyols in prepolymer (Percent of total OH equivalents)

| | | | | | | | | |
|---|---|---|---|---|---|---|---|---|
| PPG 430 | 100 | 50 | 90 | | 90 | 90 | 90 | 90 |
| TMP | | 20 | | | 10 | 10 | | 10 |
| DPG | | 20 | | | | | | |
| VORANOL CP 450 | | | 10 | | | | 10 | |
| Mixed Adhesive Equivalents NCO/OH | 1.2 | 1.2 | 1.2 | 1.2 | 1.2 | 1 | 1.2 | 1.3 |
| % solids | 50 | 50 | 50 | 50 | 50 | 50 | 50 | 50 |
| Mixed Viscosity (mPas at 25 C.) | 50 | 70 | 33.3 | 53 | | | 24 | |
| Laminations | | | | | | | | |

90 Degree T-Peel Results (N/15 mm)

| 92LBT/GF19 | | | | | | | | |
|---|---|---|---|---|---|---|---|---|
| Green | 3.04 AS | 3.50 AS | 2.75 AS | 3.77 AS | 1.78 AS | 1.70 AS | 1.13 AS | 1.74 AS |
| 1 d | 5.33 DES | 1.75 DES | 6.48 DES | 6.50 DES | 6.95 DES | 4.92 DES | 6.29 DES | 5.83 DES |
| 7 d | 3.26 DES | 5.32 DES | 6.57 DES | 2.85 DES | | | 6.34 DES | |
| PET-AL/GF19 | | | | | | | | |
| Green | 3.34 AS | 3.05 AS | 2.30 AS | 4.42 AS | 1.67 AS | 1.59 AS | 0.80 AS | 1.47 AS |
| 1 d | 5.71 DES | 2.23 DES | 6.23 DES | 7.06 DES | 5.81 DES | 5.86 DES | 5.77 AS | 5.74 DES |
| 7 d | 5.20 DES | 3.94 DES | 6.60 DES | 4.40 DES | | | 6.43 DES | |

AT (adhesive transfer from primary film to secondary);
AS Adhesive split (adhesive on both films);
DES (film breaks or tears)

TABLE 6

Adhesives made from range of polyesters.

| Part A (Polyester) | Example 7 | Example 8 | Example 10 | Example 11 | Example 11 |
|---|---|---|---|---|---|
| Polyester co-monomer | castor oil (2% of polyester w/w) | adipic 10% of acid Eq | adipic 30% of acid Eq | hexanediol instead of DEG | hexanediol instead of DEG |
| OH# | 19 | 20 | 26 | 56 | 56 |
| Part B (Prepolymer) | Example 17 | Example 17 | Example 17 | Example 17 | Example 30 Desmodur L75 |

TABLE 6-continued

Adhesives made from range of polyesters.

| Isocyanate | 4,-4' MDI | 4,-4' MDI | 4,-4' MDI | 4,-4' MDI | (TDI-based) |
|---|---|---|---|---|---|
| Polyols in prepolymer (Percent of total OH equivalents) | | | | | |
| PPG 430 | 90 | 90 | 90 | 90 | |
| VORANOL CP 450 | 10 | 10 | 10 | 10 | |
| Mixed Adhesive | | | | | |
| Equivalents NCO/OH | 1.2 | 1.2 | 1.2 | 1.2 | 1.2 |
| % solids | 50 | 50 | 50 | 50 | 50 |
| Mixed Viscosity (mPas at 25 C.) | 27.6 | 24.6 | 24.5 | 18.3 | 21.7 |
| Laminations | | | | | |
| 90 Degree T-Peel Results (N/15 mm) | | | | | |
| 92LBT/GF19 | | | | | |
| Green | 1.43 AS | 1.35 AS | 0.23 AS | 0.12 AS | 1.16 AS |
| 1 d | 4.08 AS | 4.49 AS | 7.41 AS | 4.44 AS | 9.87 DES |
| 7 d | | 9.86 DES | 9.87 DES | 4.31 AS | 6.65 DES |
| PET-AL/GF19 | | | | | |
| Green | 1.32 AS | 0.39 AS | 0.33 AS | 0.14 AS | 0.93 AS |
| 1 d | 5.11 AS | 4.62 AS | 9.46 AS | 4.54 AS | 10.32 DES |
| 7 d | | 5.98 DES | 10.02 DES | 4.21 AS | 7.16 DES |
| PET-AL/92LBT | | | | | |
| Green | 0.90 AS | 0.91 AS | 0.18 AS | 0.06 AS | 0.55 AS |
| 1 d | 3.64 AS | 3.82 AS | 5.83 AS | 3.17 AS | 5.41 DES |
| 7 d | | 7.23 DES | 6.69 DES | 2.79 AS | 5.58 DES |

Use of Acrylic Additive to Improve Flow Control

Example 43

Preparation of Polyester for Use as One Part of a Solvent Based Polyurethane Adhesive that May be Applied at High Solids Concentration 1. Diethylene glycol (343 lbs, 156 kg), phthalic anhydride (440 lbs, 200 kg) and 1 lb (454 g) of FASCAT 9100 ($C_4H_9SnO(OH)$ catalyst from Arkema) were charged to a 100 gallon (379 L) stainless steel reactor equipped with a jacketed fractionating column and a condenser.
2. As in Example 1.
3. As in Example 1, but pressure gradually decreased to 25-50 torr.
4. The reaction was held at 225° C. and 25-50 torr until the acid number of the polyester was <2.0 mg KOH/g sample. When the polyester viscosity was 2080 (at 100° C.) and the acid number 1.7, the reactor was cooled and ethyl acetate added to obtain 74-76% solids. The final product test results showed: 75.5% solids, acid number 1.2 and OH number 27.2 mg KOH/g sample and viscosity was 750 mPas. Other batches prepared by this process gave acid numbers ranging from 1.2-1.6 and hydroxyl numbers 24-28 mg KOH/gram at 74-76% solids.

Example 44

Preparation of Isocyanate Terminated Prepolymer

The jacket on a five gallon glass lined reactor was heated to 50° C. Molten ISONATE 125M (33.5 lbs, 15.2 kg) was charged to the reactor and the temperature kept above 50° C. to prevent it from freezing. The reaction mixture was continuously stirred and kept under an atmosphere of dry nitrogen. VORANOL CP 450 (1.25 lbs, 0.57 kg) was charged followed by 425 mole weight polypropylene glycol. The polyols were added at a rate to keep the temperature in the reactor above 50° C. The reactor was heated and held at 60-65° C. for 30 minutes. The temperature was increased to 80° C. and held at 80-90° C. for one hour. The reactor was cooled to 60 C then 9 lbs (4.1 kg) of ethyl acetate and 8.2 grams of benzoyl chloride added. The product analysis showed: 85.7% solids, 12.8% NCO and viscosity was 394 mPas.

Example 45

High Speed Lamination with No Additives

Laminations were run on an Egan laminator. Drier oven zones 1-3 were set at 180 (82), 170 (77) and 180 (82)° F. (° C.). Nip roll temperature was 180° F. (82° C.). Gravure cylinders with quadrangular shaped cells engraved at 130-180 lines/inch (51-71 lines/cm) were used. The adhesives tested were made from the polyester (Example 43) combined with DESMODUR L-75 (Bayer Corporation) or with the isocyanate terminated prepolymer described in Example 44. The solution was diluted to target percent solids with dry ethyl acetate. Table 7 shows the adhesives, adhesive viscosity at running solids, additives, films, gravure cylinder used and applied coat weight. In general, the adhesives had a hazy appearance when they were first coated due to the transfer of the cell pattern and variation in adhesive thickness. While the adhesive cures, the pressure from the wrap of the film on the roll helps smooth out the adhesive and some of the cured films were clearer and acceptable. However, the initial hazy appearance is undesirable, because one cannot always rely on the appearance to improve during curing. The cylinders with higher lines/inch (finer pattern) gave better appearance, but the smaller cylinder volume gave low coating weights. In some samples, DOWANOL PMA (Propylene glycol methyl ether acetate, Dow Chemical Company) was added to see if the slower evaporating solvent would aid the flow of the adhesive as it dried. The PMA was not effective in improving appearance and it lead to some reduction of green bonds.

Example 46

Lab Screening Study of Surfactants or Flow and Wetting Additives

Samples of the films were cut into 9"×12" (22.9×30.5 cm) sections. Films requiring corona treatment were treated to obtain a surface energy of 36 dynes or higher. The secondary film was placed on the rubber pad of the laminator (treated side up). The primary film was attached to a hard flat surface (treated side up). A sample of the mixed adhesive diluted to 50% solids was applied to the primary film with a Meyer #6 wire wound rod. The coat weight was approximately (2.75-3.0 g/m$^2$). If necessary, the adhesive concentration was adjusted to obtain the target coat weight. The solvent was evaporated from the adhesive by placing the coated film in an 80° C. forced air oven for 30 seconds. The primary film was removed from the plate and the top edge of the film (adhesive side down) mated to the top of the secondary film on the laminator pad. The oil heated roller of the laminator was passed over the films pulling the primary film in contact with the secondary film and laminating the two films together. The initial or "green" bonds were tested as soon as possible after the laminate was made. The T-peel test was done on laminate samples cut to 15 mm or 25 mm (1 inch) wide strips and pulled at a rate of 10 in/min (25.4 cm/min) Conversion factors were used as necessary to report bond values as N/15 mm All laminates made in this manner gave smooth coatings of adhesive with no evidence of haziness or uneven application. So, it was not possible to detect the problems seen with the gravure cylinder pattern that was apparent in the high speed coating process. A screening study was done to look for additives that might improve flow of the adhesive after application in the high speed process. Several surfactants were tested. Table 8 shows that when these were used, there was a significant drop in green bond strength. MODAFLOW 2100 is an commercial product marketed to improve flow and wetting of paint and coatings. When this was tested, it did not reduce the green strength as much as other additives. Although the MODAFLOW is soluble in ethyl acetate, it was not miscible with the adhesive solution. It gave a hazy mixture. Phase separation was slow, but was complete in a few days.

Example 47

Egan Laminator Study of Flow and Wetting Additives

Based on the results of the lab studies, MODAFLOW and other related additives were tested on the high speed laminator with the application conditions described in Example 45. A cylinder with quadrangular cells connected by channels was used and this cylinder gave some improvement in adhesive flow and smoothing over that observed with simple quad cell cylinders. Tables 9 & 10 show that the acrylic additives MODAFLOW and BYK 392 (non-hydroxy-functional acrylics) were somewhat effective at improving the flow the adhesive after it was transferred from the cylinder to the film. The coating was smoother and clearer. With the additives, acceptable appearance could be obtained even with the adhesive applied at 55% solids. Also, the green strength was maintained. The problem with these additives was that they were not miscible with the adhesive solution. If they were added to part A or B, phase separation was observed after a period of hours or days. In order to use these, small amounts would have to be added as a third component at the time the adhesive is mixed. Multi-component mixes like this are undesirable because of the potential for errors. Also, these acrylics have no groups that will react with the isocyanate coreactant. Since they will not be bound to the cured adhesive, there is the potential for them to interfere with adhesion over time. The silicone additive BYK 233 was not effective and it reduced green bonds.

Example 48

Preparation of Hydroxyfunctional (Hydroxyethyl) Acrylic in Polyol

Prepared Mix A and Mix B in stirred tanks. Stirred each mix for at least 30 minutes. Mix B may be stirred longer if necessary to completely dissolve the VAZO 64. Charged 896.8 lbs (406.8 kg) of Polyol VORANOL 230-238 (Dow Chemical Co.) to reactor equipped with jacket for heating/cooling and reflux condenser. Purged the reactor with a slow stream of nitrogen throughout the process. Heated the reactor to 80° C. with agitation. Held the batch at 80° C. for 30 min Started feeding Mix B at 0.25 lb/min (0.11 kg/min) and continued feeding for 30 minutes. While continuing to feed Mix B, started feeding Mix A at 0.75 lbs/minute (0.34 kg/min) and continued feeding for one hour. While still feeding Mix B, increased the feed rate of Mix A to 1.5 lbs/min (0.68 kg/min) and continued feeding for 8 hours. The feed of Mix A and B were completed at about the same time. Charged 224.2 lb (102 kg) of VORANOL 230-238 to the reactor and rinsed the Mix B feed line with 10 lb (4.5 kg) of acetone. Set the reactor for distillation rather than reflux, pulled vacuum on the reactor and heated to 135° C. Continued vacuum distillation for 1 hour. Started a flow of nitrogen through the bottom of the reactor. Continued to sparge the reactor with nitrogen while distilling under vacuum for 10 hours. Cooled to 50° C. or less then packaged. Product viscosity was 2000-3000 mPas; OH number 170-190 mg KOH/gram sample; Mn 14,200, Mw 27,000.

|  | Mix A | Mix B |
|---|---|---|
| Butyl Methacrylate | 1.6 lb (0.73 kg) |  |
| Hydroxyethyl Acrylate | 122.1 lb (55.5 kg) |  |
| Butyl Acrylate | 624.9 lb (284.1 kg) |  |
| VAZO 64 |  | 9.5 lb (4.3 kg) |
| Acetone |  | 111 lb (50.5 kg) |

Example 49

Preparation of Hydroxyfunctional (Hydroxypropyl) Acrylic Additive in Solvent

Five mixtures were prepared containing the grams of the materials shown in the table below. Mix A was added to a one liter reactor and heated to 82° C. while sparging the reactor with nitrogen. The temperature was gradually increased until the isopropanol just began to reflux. Fifty percent of Mix B was added to the reactor followed by 10% of Mix C. There was a 2-5° C. rise in temperature from the heat of reaction. The remainder of Mix B and Mix C were gradually added over 120 min. The rates of addition were adjusted so that Mix A addition was complete in 120 min and Mix C in 105 min. The reactor was heated to maintain reflux for 60 minutes. Mix D was added and reflux continued for 15 minutes. Mix E was gradually added over 45 minutes then the solution kept at reflux for 60 minutes. The solvent was stripped from the product by vacuum distillation in a 60° water bath. Product properties: Mn 8,300, Mw 17,500

|  | Mix A | Mix B | Mix C | Mix D | Mix E |
|---|---|---|---|---|---|
| Dry Isopropanol | 175.8 | 120.0 |  | 10 | 25.5 |
| TRIGINOX 125-C75 |  | 8 |  | 1.2 | 1.8 |
| Ethylhexyl acrylate |  |  | 320 |  |  |
| Hydroxypropyl methacrylate |  |  | 80 |  |  |

Example 50

Preparation of Hydroxyl Functional (Hydroxyethyl Methacrylate) Acrylic Additive in Solvent Three mixtures were prepared according to the table below. Ethyl acetate (93 g) was charged to a 1 liter reaction flask equipped with stirrer, reflux condenser, nitrogen sparge, thermometer, and two addition ports. The solvent was heated to 75° C. Mix A feed was started at a rate to complete the addition in 246 minutes and Mix B feed was set to complete 240 minutes. Heat was applied to the reactor as necessary to maintain ethyl acetate reflux throughout the addition. After the addition of Mix A and B was complete the reactor was held at reflux for 2 hours. Mix C was added and the reaction kept at reflux for an additional 2 hours. The product was cooled, passed through a 100 mesh filter and packaged. Product properties: Mn 65,300, Mw 177,150.

|  | Mix A | Mix B | Mix C |
|---|---|---|---|
| Butyl Acrylate | 311.4 |  |  |
| Styrene | 0.59 |  |  |
| Hydroxyethyl methacrylate | 68.0 |  |  |
| VAZO 64 |  | 4.7 | .05 |
| Ethyl Acetate |  | 60 | 6 |

Example 51

Hydroxy Functional Acrylate Additives in High Speed Laminations

Table 11 shows that the hydroxy functional acrylics, Examples 48 & 49, effectively improved flow out of the adhesive on the film after deposition from the gravure cells. The initial appearance was good and green strength was maintained. Also, tables 11-13 show that the hydroxyl functional additives generally gave better cured bonds (film tear rather than cohesive or adhesive failure) than the non-functional additives (Tables 9-10). Like the other acrylics tested these additives were not miscible in the polyester polyol part of the adhesive. Surprisingly, they formed stable emulsions in the solutions of polyester in solvent. The emulsions were stable for weeks or months. Example 48 gave the most stable emulsion which was stable for over 6 months at room temperature. Also, Tables 11-13 show that Example 48 additive was more effective than Examples 49 & 50 in giving clear laminates. Table 13 shows that Example 48 acrylic was effective in improving appearance over a range of concentrations. However, it does reduce green bonds when added at higher levels.

TABLE 7

Effect of gravure cylinders on the appearance of laminations.

|  | Polyester polyol | Isocyanate | Dilution Solvent | Visc* (sec) | Solids (%) | Additive | Primary | Secondary |
|---|---|---|---|---|---|---|---|---|
| A | Example 43 | Example 30 | EtOAc | 18 | 50 | None | 92LBT | GF19 |
| B | Example 43 | Example 30 | EtOAc | 18 | 50 | 2% DOWANOL PMA | PET-Al | GF19 |
| C | Example 43 | Example 30 | EtOAc | 18 | 50 | 2% DOWANOL PMA | 92LBT | GF19 |
| D | Example 43 | Example 30 | EtOAc |  | 50 | None | PET-Al | GF19 |
| E | Example 43 | Example 30 | EtOAc |  | 50 | None | 92LBT | GF19 |
| F | Example 43 | Example 44 | EtOAc | 17 | 50 | None | 92LBT | GF19 |
| G | Example 43 | Example 44 | EtOAc | 17 | 50 | 5% DOWANOL PMA | 92LBT | GF19 |
| H | Example 43 | Example 44 | MEK | 17 | 50 | None | 92LBT | GF19 |
| I | Example 43 | Example 44 | MEK | 17 | 55 | None | 92LBT | GF19 |
| J | Example 43 | Example 44 | EtOAc | 17 | 55 | None | 92LBT | GF19 |
| K | Example 43 | Example 44 | EtOAc | 22 | 60 | None | 92LBT | GF19 |
| L | Example 43 | Example 44 | EtOAc | 17 | 50 | None | 92LBT | GF19 |

Polyester polyol/Isocyanate Prepolymer mix ratio was 100/18
*Viscosity was measured with a #2 Zahn cup after the adhesive solution had been diluted to the target running solids.
92 LBT = 92 guage PET, GF19 = LDPE,
PET-Al = aluminum foil laminated to PET for reinforcment.
Adhesive applied to aluminum.

|  | Gravure Cylinder (lines/in) | Coat wt g/sq. m | Appearance Rating* | Green Bond N/15 mm | | 1 day T Peel N/15 mm | | 7 d T Peel N/15 mm |
|---|---|---|---|---|---|---|---|---|
|  |  |  |  |  | MOF** |  | MOF** |  |
| | 130 Quad (51.2 lines/cm, 18.2 BCM) | | | | | | | |
| A | 130 Quad | 4.9 | 2 | 1.82 | AS | 3.09 | AS | 4.93 AS |
| B | 130 Quad | 4.9 | 2+ | 1.88 | AS | 2.93 | AS | 4.37 AT |
| C | 130 Quad | 4.9 | 2+ | 1.58 | AS | 3.67 | AS | 6.11 DES |

TABLE 7-continued

| | | | | | | | | | | |
|---|---|---|---|---|---|---|---|---|---|---|
| 150 Quad (59.1 lines/cm, 14.8 BCM | | | | | | | | | | |
| D | 150 Quad | 3.7 | 2 | 1.51 | AS | 2.52 | AS | 4.36 | AT | |
| E | 150 Quad | 3.7 | 2 | 1.00 | AS | 2.29 | AS | 3.67 | AS | |
| F | 150 Quad | 4.4 | 2 | 1.21 | AS | 3.31 | AS | 5.07 | AT | |
| G | 150 Quad | 4.4 | 2 | 0.85 | AS | | | | | |
| H | 150 Quad | 3.6 | 2 | 0.67 | AS | 3.30 | AS | 5.07 | AT | |
| I | 150 Quad | 4.1 | 2 | 0.73 | AS | 4.70 | AS | 5.70 | AT | |
| 180 Quad (71 lines/cm, 11.5 BCM | | | | | | | | | | |
| J | 180 Quad | 2.0 | 3 | 0.83 | AS | 3.61 | AS | 4.13 | AS | |
| K | 180 Quad | 1.8 | 2+ | 0.64 | AS | 3.61 | AS | 3.99 | AS | |
| L | 180 Quad | 1.5 | 3 | | | 3.03 | AS | 3.58 | AS | |

BCM = Billion cubic microns
**Mode of Failure:

| Score* | Initial Appearance | Appearance after 24 h cure |
|---|---|---|
| 1 | distinct cell pattern, hazy, streaks | Hazy, streaks, unnacceptable |
| 2 | Distinct cell pattern, hazy, not acceptable | some cell pattern, but maybe acceptable |
| 3 | Distinct cell pattern, hazy, borderline acceptable | some cell pattern, but acceptable |
| 4 | Some cell pattern, typical commercial adhesive | some cell pattern, but acceptable |
| 5 | Very little cell pattern | very little cell pattern |

TABLE 8

Lab screening study for additives

| Polyester (100) | Ex. 43 | Ex. 43 | Ex. 43 | Ex. 43 | Ex. 43 | Ex. 43 |
|---|---|---|---|---|---|---|
| Co-reactant (18) | Ex. 44 | Ex. 44 | Ex. 44 | Ex. 44 | Ex. 44 | Ex. 44 |
| Additive | SURFYNOL 420 | SURFYNOL 440 | TRITON X100 | FLUORAD 4430 | MODAFLOW 2100 | Control (no additive) |
| % Additive | 0.05 | 0.05 | 0.05 | 0.05 | 0.5 | 0 |
| Mixed Viscosity | 22.8 | 25.4 | 26.3 | 24.4 | 33.7 | 25.6 |
| | N/15 mm | N/15 mm | N/15 mm | N/15 mm | N/15 mm | N/15 mm |
| 92LBT/GF19 | | | | | | |
| Initial | 0.81 | 0.764 | 0.741 | 0.845 | 1.048 | 1.569 |
| 24 hr | 5.12 | 4.759 | 4.904 | 4.979 | 1.048 | 3.619 |
| 7 day | 3.64 | 4.261 | 4.678 | 5.084 | 1.048 | 4.678 |
| PET-Al/GF19 | | | | | | |
| Initial | 0.61 | 0.614 | 0.608 | 0.799 | 1.048 | 1.482 |
| 24 hr | 5.18 | 5.263 | 4.626 | 5.790 | 1.048 | 6.676 |
| 7 day | 5.39 | 5.929 | 5.385 | 5.998 | 1.048 | 7.463 |
| PET-Al/GF19 | | | | | | |
| Initial | 0.34 | 0.347 | 0.295 | 0.388 | 1.048 | 1.158 |
| 24 hr | 3.25 | 3.04* | 3.242 | 3.27* | 1.048 | 2.97** |
| 7 day | 3.24 | 3.00* | 3.069 | 3.07* | 1.05** | 4.55** |

*Mode of Failure = Adhesive transfer from primary (PET or Aluminum) to secondary film
**Mode of Failure = Film break or tear
Mode of failure for all other samples was adhesive split (adhesive on both films)
SURFYNOL 420: Nonionic surfactant from Air Products Company; HLB = 4
SURFYNOL 440: Nonionic surfactant from Air Products Company; HLB = 8
TRITON X 100: Octylphenol ethoxylate from Dow Chemical Company; HLB = 13.4
FLUORAD 4430: Fluorosurfactant, 3M Company
MODAFLOW 2100: Cytec Surface Specialties, Inc.: Ethyl acrylate/Ethyl hexyl acrylate copolymer.

TABLE 9

High speed lamination tests with additives to improve appearance
Mix Ratio (Polyester Ex. 43/Coreactant Ex. 44/additive) 100/18/0.5

| Additive (grams/100 g polyester solution) | Structure 1° web | Structure 2° web | Coat wt. g/sq. m | Appearance Rating | Bond Strength (90° T-Peel) Initial N/15 mm | 1 d N/15 mm | 7 d N/15 mm |
|---|---|---|---|---|---|---|---|
| none | 92LBT | GF19 | 2.69 | 3 | 0.82 AS | 3.39 AS | 3.49 AS |
| none | mPET | GF19 | 2.67 | 3 | 1.27 AS | 2.77 AS | 2.15 AT |
| none | PET-Al | GF19 | 2.67 | 3 | 0.67 AS | 2.00 AS | 2.25 AS |
| none | PET-Al | 92LBT | 2.73 | 3 | 1.63 AS | 2.04 AT | 2.32 AT |
| none | OPP | mOPP | 2.67 | 3 | 1.27 AS | 1.66 AT | 2.03 AT |
| BYK 392(Acrylic) | 92LBT | GF19 | 2.69 | 3+ | 1.17 AS | 3.74 AS | 3.49 AS |
| BYK 392(Acrylic) | mPET | GF19 | 2.73 | 3+ | 1.15 AS | 2.62 AS | 2.17 AT |
| BYK 392(Acrylic) | PET-Al | GF19 | 2.73 | 3+ | 1.56 AS | 4.76 AS | 4.91 AS |
| BYK 392(Acrylic) | PET-Al | 92LBT |  | 3+ | 1.15 AS | 2.30 AT | 2.48 AT |
| BYK 392(Acrylic) | OPP | mOPP |  | 3+ | 1.25 AS | 1.81 AT | 1.85 AT |
| BYK 356(Acrylic) | 92LBT | GF19 | 2.86 | 3 | 1.01 AS | 2.95 AS | 2.30 AT |
| BYK 233 (siloxane) | 92LBT | GF19 |  | 3 | 0.55 AS | 3.35 AS | 2.76 AT |
| MODAFLOW 2100 | 92LBT | GF19 | 2.93 | 3+ | 1.28 AS | 3.03 AS | 2.64 AT |
| MODAFLOW 2100 | mPET | GF19 | 2.77 | 3+ | 1.32 AS | 2.81 AS | 1.82 AT |
| MODAFLOW 2100 | PET-Al | GF19 | 2.60 | 3+ | 1.35 AS | 3.23 AS | 2.38 AT |
| MODAFLOW 2100 | PET-Al | 92LBT | 2.60 | 3+ | 1.56 AS | 2.29 AT | 2.21 AT |
| MODAFLOW 2100 | OPP | mOPP | 2.60 | 3+ | 0.98 AS | 1.72 AT | 2.06 AT |

All were run on at 50% solids on a 165QCH cylinder (65 lines/cm)which has quadrangular cells with interconnecting channels volume of 8.7 BCM (billion cubic microns)
Viscosity of the adhesive was 20 seconds (Zahn #2 Cup)
AS = Adhesive split (adhesive on both films)
AT = Adhesive transfer from primary to secondary film

TABLE 10

High speed laminations with additives at 55% solids.
Adhesive Mix: Polyester (Example 43)/Coreactant (Example 44)/additive (100/20/0.5)
All sample diluted to 55% solids with ethyl acetate. 165 QCH gravure cylinder

| Co-reactant | #2 Zahn Sec | Additive (parts/100 Part A) | 1° web | 2° web | Coat wt. g/sq m | Appearance Rating | Initial N/15 mm | 1 d N/15 mm | 7 d N/15 mm |
|---|---|---|---|---|---|---|---|---|---|
| Example 30 | | | | | | | | | |
|  | 19 | None | 92LBT | GF19 | 2.8 | 2+ | 1.19 AS | 2.45 AS | 3.03 AT |
|  |  | None | mPET | GF19 | 2.8 | 2+ | 1.02 AS/z | 2.48 AS | 1.74 AT |
|  |  | None | nylon | GF19 | 2.8 | 2+ | 0.99 AS | 2.36 AS | 1.55 AT |
|  |  | None | PET-Al | GF19 | 2.9 | 3 | 1.32 AS | 2.70 AS | 2.33 DES |
|  |  | None | PET-Al | 92LBT | 3.1 | 3 | 1.78 AS | 3.98 DES | 3.92 DES |
| Example 30 | | | | | | | | | |
|  | 21.7 | MF | PET-Al | 92LBT | 3.3 | 3+ | 1.45 AS | 4.44 DES | 3.69 DES |
|  |  | MF | PET-Al | GF19 | 3.1 | 3+ | 1.54 AS | 4.13 AS | 3.59 AT |
|  |  | MF | Nylon | GF19 | 3.1 | 3 | 1.16 AS | 2.89 AS | 2.12 AT |
|  |  | MF | mPET | GF19 | 3.0 | 3 | 1.09 AS | 2.37 AS | 1.86 AT |
|  |  | MF | PET | GF19 | 3.1 | 3 | 0.89 AS | 2.67 AS | 2.63 AT |
| Example 30 | | | | | | | | | |
|  | 22 | MF 2100 | 92LBT | GF19 | 3.2 | 3+ | 1.04 AS | 1.95 AS | 1.55 AT |
|  |  | MF 2100 | mPET | GF19 | 3.1 | 3+ | 1.18 AS | 2.11 AS | 1.92 AT |
|  |  | MF 2100 | nylon | GF19 | 3.2 | 3+ | 0.93 AS | 2.45 AS | 3.01 AT |
|  |  | MF 2100 | PET-Al | GF19 | 3.1 | 3+ | 1.38 AS | 2.80 AS | 2.57 AT |
|  |  | MF 2100 | PET-Al | 92LBT | 3.1 | 3+ | 1.55 AS | 2.38 DES | 3.39 DES |
| Example 30 | | | | | | | | | |
|  | 21.5 | BYK-392 | PET-Al | 92LBT | 3.1 | 3+ | 1.49 AS | 3.75 DES | 3.69 DES |
|  |  | BYK-392 | PET-Al | GF19 | 3.1 | 3+ | 1.39 AS | 3.03 AS | 2.57 AT |
|  |  | BYK-392 | Nylon | GF19 | 3.1 | 3+ | 0.89 AS/z | 0.90 AS | 1.23 AT |
|  |  | BYK-392 | mPET | GF19 | 3.1 | 3+ | 1.15 AS/z | 1.84 AS | 1.62 AT |
|  |  | BYK-392 | PET | GF19 | 3.3 | 3+ | 1.13 AS | 2.34 AS | 2.53 AT |

TABLE 10-continued

High speed laminations with additives at 55% solids.
Adhesive Mix: Polyester (Example 43)/Coreactant (Example 44)/additive (100/20/0.5)
All sample diluted to 55% solids with ethyl acetate. 165 QCH gravure cylinder

| Example 44 | | | | | | | | | | | |
|---|---|---|---|---|---|---|---|---|---|---|---|
| 21.7 | MF 2100 | 92LBT | GF19 | 3.3 | 3+ | 0.94 | AS | 3.76 | AS | 3.45 | AT |
|  | MF 2100 | mPET | GF19 | 3.1 | 3+ | 1.50 | AS | 2.80 | DES | 2.72 | DES |
|  | MF 2100 | PET-Al | GF19 | 3.1 | 3+ | 1.93 | AS | 3.71 | AS | 2.73 | AT |
|  | MF 2100 | PET-Al | 92LBT | 3.1 | 3+ | 1.60 | AS | 2.69 | AS | 4.19 | AT |

MF = Modaflow
note:
z = zippy

TABLE 11

Test additional hydroxyl functional acrylic additives in high speed laminating process.
Adhesive Mix: Polyester (Example 43)/Coreactant (Example 44)/Additive (100/18/0.5)
All samples were all diluted to 50% solids with ethyl acetate and run on 150 Quad cylinder
Viscosity was 19 seconds for #2 Zahn cup

| Additive (0.5 parts/100 g Polyester) | 1° web | 2° web | Coat wt. g/sq. m | Appearance Rating | Initial T-Peel N/15 mm | | 1 day N/15 mm | | 7 d N/15 mm | |
|---|---|---|---|---|---|---|---|---|---|---|
|  | 92LBT | GF19 | 4.39 | 2 | 0.72 | AS | 2.12 | AS | 2.12 | AS |
|  | mPET | GF19 | 4.65 | 2 | 0.87 | AS | 1.89 | AS | 3.56 | DES |
|  | PET-Al | GF19 | 4.82 | 2 | 0.95 | AS | 2.88 | AS | 2.48 | AS |
|  | PET-AL | 92LBT | 4.72 | 2 | 1.71 | AS | 3.39 | AS | 4.67 | DES |
|  | 75 SLP | mOPP | 4.88 | 2 | 1.46 | AS | 1.29 | DES | 2.08 | DES |
| Ex. 48 | 92LBT | GF19 | 5.05 | 4 | 1.02 | AS | 2.13 | AS | 1.54 | AS |
| Ex. 48 | mPET | GF19 | 4.72 | 4 | 1.11 | AS | 2.07 | AS | 1.87 | AS |
| Ex. 48 | PET-Al | GF19 | 5.05 | 4 | 1.44 | AS | 2.28 | AS | 1.93 | AS |
| Ex. 48 | PET-AL | 92LBT | 4.72 | 4 | 2.19 | AS | 4.10 | AS | 4.28 | DES |
| Ex. 48 | 75 SLP | mOPP | 4.72 | 4 | 1.40 | AS | 2.02 | DES | 2.34 | DES |
| Ex. 49 | 92LBT | GF19 | 4.88 | 3 | 0.91 | AS | 1.45 | AS | 2.12 | AS |
| Ex. 49 | mPET | GF19 | 4.72 | 3 | 1.04 | AS | 1.24 | AS | 3.31 | DES |
| Ex. 49 | PET-Al | GF19 | 4.72 | 3 | 1.59 | AS | 1.73 | AS | 2.39 | AS |
| Ex. 49 | PET-AL | 92LBT | 4.88 | 3 | 1.02 | AS | 4.51 | DES | 5.37 | DES |
| Ex. 49 | 75 SLP | mOPP | 4.88 | 3 | 1.03 | AS | 2.02 | AS | 2.98 | DES |

*Gravure cylinder 150 lines/in (59 lines/cm) quadrangular cells, 14.8 BCM
BCM = billion cubic microns
AS = Adhesive split (on both films)
DES = Film breaks or tears

TABLE 12

Hydroxy functional acrylics
Adhesive Mix: Polyester(Ex. 43)/Coreactant (Ex. 44)/Additive (100/20.5/0.1-0.2)
All run at 50% solids on 150 lines/in (59 lines/cm) quadrangular cell cylinder

| #2 Zahn Sec | Ex. 50 additive (g/100 g polyester) | 1° web | 2° web | Coat wt. g/sq m | Appearance Rating | Initial T-Peel N/15 mm | | 1 d N/15 mm | | 7 d N/15 mm | |
|---|---|---|---|---|---|---|---|---|---|---|---|
| 17.2 | 0.1 | 75 SLP | 70 SPW | 3.91 | 2+ | 1.82 | AS | 3.91 | DES | 2.54 | DES |
| 18.5 | 0.2 | 75 SLP | 70 SPW | 3.91 | 2+ | 1.92 | AS | 4.70 | DES | 2.47 | DES |
|  | 0.125 | nylon | GF10 | 2.77 | 3 | 1.05 | AS | 9.74 | DES | 11.20 | DES |
|  | 0.125 | 92LBT | GF10 | 2.60 | 3 | 1.10 | AS | 2.14 | AS | 7.90 | DES |
|  | 0.125 | 92LBT | GF19 |  |  | 0.69 | AS | 2.52 | AS | 3.04 | AS |
|  | 0.125 | 92LBT | GF19 | 2.44 | 3 | 1.58 | AS | 3.63 | AS | 2.21 | AS |
|  | 0.125 | nylon | GF10 |  |  | 1.58 | AS | 7.56 | DES | 2.15 | DES |
|  | 0.25 | nylon | GF10 |  | 2+ | 2.28 | AS | 9.11 | DES | 3.76 | DES |
| 20 | 0.08 | nylon | GF10 | 2.60 | 3+ | 1.79 | AS | 6.14 | DES | 4.96 | DES |
|  | 0.125 | PET-AL | CPP | 4.56 | 3 | 1.78 | AS | 7.12 | AT | 7.42 | AT |
|  | 0.125 | PET-Al | PET | 4.39 | 3 | 0.52 | AS | 4.16 | DES | 5.27 | DES |
|  | 0.125 | PET-Al | GF10 | 4.39 | 3 | 1.35 | AS | 9.25 | DES | 9.76 | DES |
|  | 0.125 | PET-Al | GF19 | 4.39 | 3 | 1.18 | AS | 5.86 | DES | 8.96 | DES |
|  | 0.125 | mPET | GF19 | 4.39 | 3 | 0.74 | AS | 2.37 | DES | 1.55 | DES |
|  | 0.125 | 92LBT | GF10 | 4.56 | 3 | 1.44 | AS | 6.15 | DES | 9.77 | DES |
|  | 0.125 | 92LBT | GF19 | 4.56 | 3 | 1.03 | AS | 4.35 | AT | 7.65 | DES |
|  | 0.125 | 75SLP | mOPP | 4.56 | 3 | 0.84 | AS | 2.14 | DES | 2.84 | DES |
|  | 0.125 | 75SLP | 70SPW | 4.56 | 3 | 1.14 | AS | 1.90 | DES | 2.84 | DES |

TABLE 13

Adhesive Mix: Polyester (Ex. 43)/Coreactant (Ex. 44)/additive (100/20.5/0.4-1.4)
All samples diluted to 50% solids with ethyl acetate.
A 165 line/in (65 lines/cm) cylinder with channeled quadrangular cells was used.

| Drier Zones | 1 | 2 | 3 | Corona Treater Output | |
|---|---|---|---|---|---|
| Temp (F.) | 180 | 170 | 200 | Primary | 2.0 Kw |
| Viscosity 16.5 seconds #2 Zahn cup | | | | Secondary | 3.0 Kw |

| Ex. 48 Additive (g/100 g Polyester) | 1° web | 2° web | Coat wt g/sq m | Appearance Rating | Green Bonds N/15 mm | 24 h N/15 mm | 7 d N/15 mm |
|---|---|---|---|---|---|---|---|
| 0.4 | 92LBT | GF19 | 2.93 | 3+ | 1.06 AS | 3.53 AS | 3.91 AS |
| 0.4 | 92LBT | GF10 | 2.93 | 3+ | 2.00 AS | 5.67 DES | 9.06 DES |
| 0.4 | mPET | GF10 | 2.93 | 3+ | 1.09 AS | 2.07 DES | 2.44 DES |
| 0.4 | mPET | GF19 | 2.77 | 3+ | 1.46 AS | 2.44 DES | 3.21 DES |
| 0.4 | 75SLP | GF10 | 2.77 | 3+ | 1.76 AS | 3.66 DES | 3.59 DES |
| 0.4 | PET-Al | GF10 | 2.77 | 3+ | 2.09 AS | 7.63 DES | 9.16 DES |
| 0.4 | PET-Al | GF19 | 2.93 | 3+ | 1.79 AS | 5.26 AT | 4.76 AT |
| 0.4 | PET-Al | 92LBT | 3.01 | 3+ | 1.37 AS | 3.96 DES | 5.25 DES |
| 0.4 | 75SLP | mOPP | 3.09 | 3 | 1.12 AS | 1.76 AT | 1.69 AT |
| 0.4 | 92LBT | 70SPW | 2.93 | 3+ | 1.78 AS | 2.04 DES | 4.37 DES |
| 0.75 | 75SLP | GF10 | 2.52 | 4 | 1.24 AS | 3.83 DES | 3.07 DES |
| 0.75 | 92LBT | GF10 | 2.93 | 4 | 1.47 AS | 6.04 DES | 7.91 DES |
| 0.75 | 92LBT | GF19 | 2.93 | 4 | 0.94 AS | 3.20 AS | 3.79 AS |
| 0.75 | mPET | GF19 | 2.93 | 4 | 0.94 AS | 2.41 DES | 2.65 DES |
| 0.75 | mPET | GF10 | 2.90 | 4 | 0.96 AS | 2.15 DES | 2.32 DES |
| 0.75 | PET-Al | GF10 | 2.93 | 4 | 1.72 AS | 8.28 DES | 9.78 DES |
| 0.75 | PET-Al | GF19 | 3.01 | 4 | 1.56 AS | 8.24 DES | 8.60 DES |
| 0.75 | PET-Al | 92LBT | 3.09 | 4 | 0.82 AS | 4.53 DES | 4.31 DES |
| 0.75 | 75SLP | mOPP | 2.93 | 4 | 1.00 AS | 1.58 AT | 1.69 AT |
| 0.75 | 92LBT | 70SPW | 2.93 | 4 | 1.51 AS | 2.22 DES | 3.79 DES |
| 0.75 | 92LBT | CPP | 2.93 | 4 | 1.57 AS | 6.96 DES | 7.39 DES |
| 0.525 | 75SLP | GF19 | 2.77 | 4 | 0.83 AS | 4.09 DES | 4.30 DES |
| 0.525 | 75SLP | GF10 | 2.77 | 4 | 1.24 AS | 4.26 DES | 3.70 DES |
| 0.525 | 75SLP | mOPP | 2.85 | 4 | 0.59 AS | 1.66 AT | 2.61 DES |
| 0.525 | PET-Al | 92LBT | 2.93 | 4 | 0.51 AS | 3.73 DES | 4.35 DES |
| 1.4 | 92LBT | GF19 | | 4 | 0.498 AS | 2.39 AS | 10.3 DES |

Example 52

NCO Terminated Prepolymer Made from Example 48 Acrylic Polyol

| Item | Monomer/Intermediate | Charge (grams) |
|---|---|---|
| 1 | ISONATE 125M, MDI | 100 |
| 2 | Acrylic polyol (Example 48) | 7.68 |
| 3 | Polypropylene glycol (425 Mole wt) | 47.3 |
| 4 | Ethyl Acetate | 27.4 |
| 5 | Benzoyl chloride | 0.1 |

1. Item 1 was heated to 50° C. in an oven and charged to a 500 mL three neck flask equipped with stirrer, reflux condenser, and nitrogen inlet. A slow stream of dry nitrogen was passed through the reactor throughout the reaction time.
2. The reactor was heated to 60°-65° C. and item 2 added.
3. The temperature was increased and held at 70°-75° C. for 30 min
4. Item 3 was added and the temperature maintained at 80°-95° C. about 90 min.
5. The temperature was reduced to 65° C. Items 4 and 5 were added.
6. The product was cooled further then packaged.

The product had the following properties: Before adding ethyl acetate, 15.0% NCO. After adding ethyl acetate: Solvent, 15.4% (84.6% solids), Viscosity 400 mPas (Brookfield viscometer, #3 spindle at 20 rpm). Initially, the product was a clear, light yellow solution. After a few days it became hazy, but there was no phase separation.

Laminates made as described in Example 46 showed good flow and wetting and had the following properties.

Polyester (100) Example 43
Co-reactant (18) Example 52
Mixed Viscosity 22.8 mPa·s

| | N/15 mm | |
|---|---|---|
| 92LBT/GF19 | | |
| Initial | 1.46 | AS |
| 24 hr | 5.70 | Destruct |
| 7 day | 6.16 | Destruct |
| PET-Al/GF19 | | |
| Initial | 1.18 | AS |
| 24 hr | 6.47 | Destruct |
| 7 day | 6.67 | Destruct |

AS = Adhesive Split (Adhesive on both films); Destruct = Film breaks or tears

The invention claimed is:

1. A two-component urethane system comprising:
(a) a hydroxy-terminated polyester polyol comprising polymerized residues of: (i) 40 to 59 wt % of phthalic acid, and (ii) 39 to 60 wt % of an aliphatic diol having $M_n$ from 60 to 150; wherein the hydroxy-terminated polyester polyol has a hydroxyl number from 15 to 60 mg KOH/g and has no more than 10 wt % polymerized residues of aliphatic acids; and (b) an isocyanate-terminated prepolymer comprising polymerized residues of:

(i) at least one of diphenyl methane diisocyanate and toluene diisocyanate; and (ii) a glycol or polyol having $M_n$ from 300 to 650; wherein the two-component urethane system is diluted with at least one solvent selected from the group consisting of ethyl acetate, methyl acetate and methyl ethyl ketone to 45-60 wt % solids.

2. The two-component urethane system of claim 1 in which the aliphatic diol has $M_n$ from 90 to 130.

3. The two-component urethane system of claim 2 in which the hydroxy-terminated polyester polyol has a hydroxyl number from 20 to 50 mg KOH/g.

4. The two-component urethane system of claim 3 in which the isocyanate-terminated prepolymer comprises polymerized residues of: (i) 50 to 85 wt % of at least one of diphenyl methane diisocyanate and toluene diisocyanate; and (ii) 15 to 50 wt % of a glycol or polyol having $M_n$ from 300 to 650.

5. The two-component urethane system of claim 4 in which the isocyanate-terminated prepolymer comprises polymerized residues of diphenyl methane diisocyanate and has an isocyanate content from 7 wt % to 21 wt %.

6. The two-component urethane system of claim 5 in which the hydroxy-terminated polyester polyol has no more than 5 wt % polymerized residues of aliphatic acids.

7. The two-component urethane system of claim 6 in which the hydroxy-terminated polyester polyol comprises from 48 to 59 wt % polymerized residues of phthalic acid and from 39 to 52 wt % polymerized residues of the aliphatic diol.

8. The two-component urethane system of claim 7 in which the hydroxy-terminated polyester polyol has a hydroxyl number from 20 to 50 mg KOH/g.

9. The two-component urethane system of claim 8 in which the isocyanate-terminated prepolymer has an isocyanate content from 11 wt % to 15 wt %.

* * * * *